US012146711B2

(12) United States Patent
Hu et al.

(10) Patent No.: US 12,146,711 B2
(45) Date of Patent: Nov. 19, 2024

(54) HIGH TEMPERATURE SINTERING FURNACE SYSTEMS AND METHODS

(71) Applicant: UNIVERSITY OF MARYLAND, COLLEGE PARK, College Park, MD (US)

(72) Inventors: Liangbing Hu, Rockville, MD (US); Xizheng Wang, Greenbelt, MD (US); Xinpeng Zhao, Berwyn Heights, MD (US); Hua Xie, Greenbelt, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 18/283,782

(22) PCT Filed: Mar. 25, 2022

(86) PCT No.: PCT/US2022/021915
§ 371 (c)(1),
(2) Date: Sep. 22, 2023

(87) PCT Pub. No.: WO2022/204494
PCT Pub. Date: Sep. 29, 2022

(65) Prior Publication Data
US 2024/0167767 A1 May 23, 2024

Related U.S. Application Data

(60) Provisional application No. 63/166,941, filed on Mar. 26, 2021.

(51) Int. Cl.
*F27B 9/06* (2006.01)
*F27B 1/12* (2006.01)
(Continued)

(52) U.S. Cl.
CPC ................ *F27B 9/063* (2013.01); *F27B 1/12* (2013.01); *F27B 1/26* (2013.01); *F27B 1/22* (2013.01); *F27B 9/02* (2013.01); *F27B 2009/124* (2013.01)

(58) Field of Classification Search
CPC ...... F27B 9/20; F27B 9/14; F27B 9/40; F27B 9/00; F27B 9/02; F27B 9/207; F27B 9/24;
(Continued)

(56) References Cited

U.S. PATENT DOCUMENTS

| | | |
|---|---|---|
| 3,330,654 A | 7/1967 | Sweet |
| 8,647,098 B2 | 2/2014 | Swanson et al. |

(Continued)

FOREIGN PATENT DOCUMENTS

| | | |
|---|---|---|
| GB | 1457415 A | 12/1976 |

OTHER PUBLICATIONS

International Search Report and Written Opinion, mailed Jun. 21, 2022, in International Application No. PCT/US22/21915. (15 pages).

*Primary Examiner* — Phuong T Nguyen
(74) *Attorney, Agent, or Firm* — RowanTree Law Group, PLLC; Frederick F. Rosenberger

(57) ABSTRACT

A sintering furnace can have a housing, one or more heating elements, and a conveying assembly. Each heating element can be disposed within the housing and can subject a heating zone to a thermal shock temperature profile. A substrate with one or more precursors thereon can be moved by the conveying assembly through an inlet of the housing to the heating zone, where it is subjected to a first temperature of at least 500° C. for a first time period. The conveying assembly can then move the substrate with one or more sintered materials thereon from the heating zone and through an outlet of the housing.

16 Claims, 18 Drawing Sheets

(51) Int. Cl.

*F27B 1/26* (2006.01)
*F27B 1/22* (2006.01)
*F27B 9/02* (2006.01)
*F27B 9/12* (2006.01)

(58) Field of Classification Search

CPC .......... F27B 9/243; F27B 9/202; F27B 9/222; F27B 5/14; F27B 9/028; F27B 9/029; F27B 9/38; F27B 2009/386; F27B 2009/026; F27B 9/063; F27B 1/12; F27B 1/26; F27B 1/22; F27B 2009/124; F27M 2003/04; C22B 1/212; F27D 3/003; F27D 2003/0034; F27D 2003/0091; F27D 2003/0095; F27D 2003/0096; F27D 3/026; F27D 3/12

USPC ......... 99/325–326, 357, 334, 352, 358, 330, 99/355, 349–351, 353, 384–385, 441, 99/517; 426/274, 275, 574, 629, 641, 426/656, 634, 516–519, 531, 335, 316, 426/320, 532; 373/110

See application file for complete search history.

(56) References Cited

U.S. PATENT DOCUMENTS

| | | | | |
|---|---|---|---|---|
| 10,807,273 | B2 | 10/2020 | Kramer et al. | |
| 2003/0143098 | A1 | 7/2003 | Weber | |
| 2008/0012499 | A1 | 1/2008 | Ragay et al. | |
| 2017/0210634 | A1 | 7/2017 | Badding et al. | |
| 2018/0369771 | A1 | 12/2018 | Hu et al. | |
| 2019/0161840 | A1 | 5/2019 | Yao et al. | |
| 2020/0156150 | A1* | 5/2020 | Ito | B22F 10/73 |
| 2021/0016354 | A1* | 1/2021 | Tanabe | B22F 7/062 |
| 2022/0219986 | A1 | 7/2022 | Hu et al. | |
| 2022/0241756 | A1 | 8/2022 | Hu et al. | |

* cited by examiner

HIGH TEMPERATURE SINTERING FURNACE SYSTEMS AND METHODS

CROSS-REFERENCE TO RELATED APPLICATIONS

The present application claims the benefit of U.S. Provisional Application No. 63/166,941, filed Mar. 26, 2021, entitled "High Temperature Sintering Furnace System," which is incorporated by reference herein in its entirety.

STATEMENT REGARDING FEDERALLY SPONSORED RESEARCH

This invention was made with government support under DE-AR0001329 awarded by the U.S. Department of Energy, Advanced Research Projects Agency—Energy. The government has certain rights in the invention.

FIELD

The present disclosure relates generally to furnaces for heating of a material, and more particularly, to high temperature (e.g., ≥500° C.) furnace systems and methods for material sintering.

BACKGROUND

High temperature sintering can be employed to process ceramic materials for use, for example, in electronics, energy storage, and extreme environment. Conventional sintering technologies, such as tube furnaces or muffle furnaces, typically require long sintering times (e.g., 10 hours), mild temperatures (~1300 K), slow heating rates (e.g., 10 K/min), and high energy input. Moreover, conventional sintering techniques may generate voids or produce contaminants in sintered materials containing volatile elements (e.g., Na, Li, etc.). These defects can render the sintered-product unsuitable for use in certain applications, such as ceramic-based solid-state electrolytes (SSEs). Furthermore, conventional sintering techniques may offer limited control over the crystal coarsening process, in which abnormal grain growth and varying size distributions can create issues.

While faster sintering technologies, such as microwave-assisted sintering (MAS), spark-plasma sintering (SPS), and flash sintering (FS), have been recently developed, they exhibit their own issues or have limited application. For example, MAS often depends on the microwave-absorption properties of the materials or use susceptors. SPS, also known as field-assisted sintering technology (FAST) or pulsed electric current sintering (PECS), can obtain dense ceramics with a comparatively short sintering time (e.g., 2-10 minutes) and a low temperature range (e.g., 1073-1883 K) with moderate pressures. However, SPS requires sophisticated and expensive equipment to simultaneously provide mechanical pressure (e.g., 6-100 MPa) and high-pulsed direct current (e.g., up to thousands of amps). While FS does not require complex instrumentation, it does require expensive platinum electrodes, and the conditions required to perform FS depend on the electrical characteristics of the material (thus may be limited to only certain materials). MAS, SPS, and FS systems can be difficult to incorporate into roll-to-roll processing systems, which may preclude their ability to offer large-scale manufacturing.

Embodiments of the disclosed subject matter may address one or more of the above-noted problems and disadvantages, among other things.

SUMMARY

Embodiments of the disclosed subject matter provide high temperature sintering furnace systems and methods. In some embodiments, high temperature sintering furnace systems can involve a roll-to-roll processing configuration, which can enable large-scale and/or continuous manufacturing of sintered materials (e.g., ceramics). The sintering furnace can have one or more heating elements (e.g., a Joule heating element) that generate sintering temperatures in excess of 500° C., for example, about 1000-3000° C. over a relatively short time period (e.g., ≤60 s, such as ≤about 10 s). In some embodiments, each heating element can rapidly heat to and/or rapidly cool from the sintering temperature. For example, the heating element can transition from a low temperature (e.g., room temperature, such as 20-25° C., or an elevated temperature much less than 500° C., such as 200° C.) to the sintering temperature at a heating rate of at least $10^{3}$° C./minute (e.g., ≥$10^{3}$° C./s, for example, $10^{3}$-$10^{4}$° C./s, inclusive). Alternatively or additionally, in some embodiments, the heating element can transition from the sintering temperature to a lower temperature (e.g., room temperature or an elevated temperature less than 500° C., such as 200° C.) at a cooling rate of at least $10^{4}$° C./minute (e.g., ≥$10^{4}$° C./s).

In one or more embodiments, a sintering furnace can comprise a housing, at least one heating element, a conveying assembly, and a control system. The housing can define an interior volume, an inlet to the interior volume, and an outlet from the interior volume. The at least one heating element can be disposed within the interior volume of the housing between the inlet and the outlet. Each heating element can be constructed to subject a heating zone to a temperature profile. The conveying assembly can be constructed to move one or more substrates into, within, and out of the housing. The control system can be operatively coupled to the at least one heating element and the conveying assembly. The control system can comprise one or more processors and computer readable storage media storing instructions that, when executed by the one or more processors, cause the control system to move, via the conveying assembly, a first substrate with one or more precursors thereon through the inlet to the heating zone; subject, via the at least one heating element, the first substrate in the heating zone to a first temperature of at least 500° C. for a first time period; and move, via the conveying assembly, the first substrate with one or more sintered materials thereon from the heating zone and through the outlet.

In one or more embodiments, a sintering furnace can comprise a housing, a dispenser, at least one heating element, a sample collector, and a control system. The housing can define an interior volume, an inlet to the interior volume, and an outlet from the interior volume. The dispenser can be constructed to provide one or more precursor particles to the inlet of the housing. The at least one heating element can be disposed within the interior volume of the housing between the inlet and the outlet. Each heating element can be constructed to subject one or more precursor particles to a temperature profile. The sample collector can be constructed to receive one or more sintered particles from the outlet of the housing. The control system can be operatively coupled to the at least one heating element. The control system can comprise one or more processors and computer readable storage media storing instructions that, when executed by the one or more processors, cause the control system to subject, via the at least one heating element, the one or more precursor particles to a first temperature of at least 500° C. for a first time period.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1A:
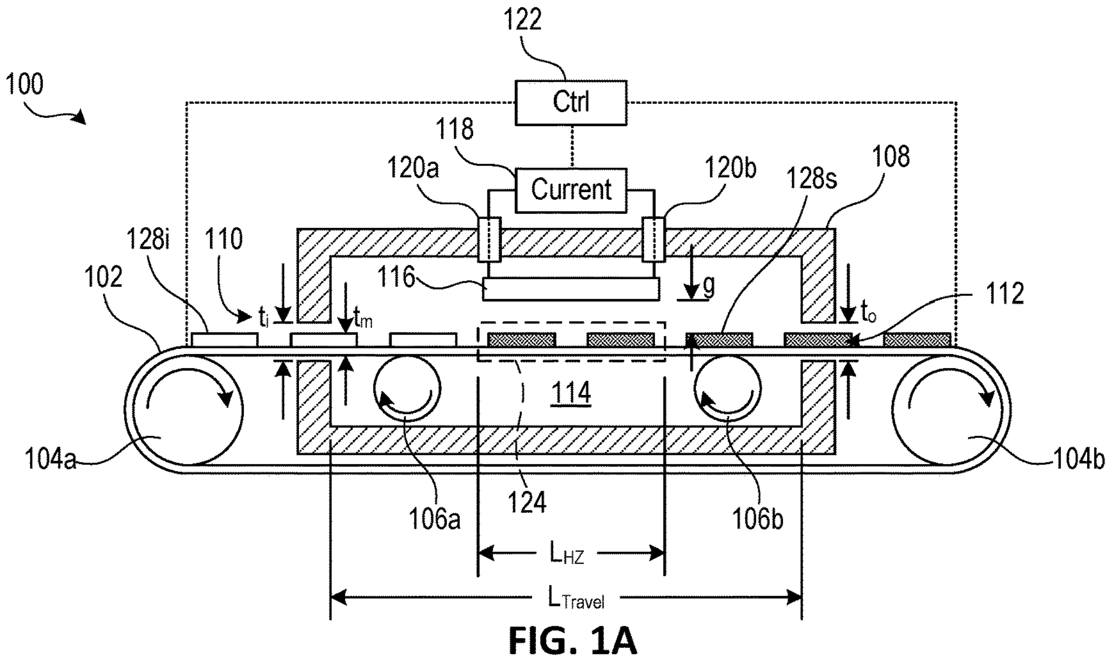
FIG. 1A is a simplified cross-sectional diagram of a high temperature sintering furnace, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those skilled in the art in the practice of the disclosed subject matter.

Thermal shock: Application of a sintering temperature for a time period having a duration less than about 10 seconds. In some embodiments, the duration of the time period of sintering temperature application is in a range of about 1 microsecond to about 10 seconds, inclusive, for example, about 55 milliseconds.

Sintering temperature: A maximum temperature at a surface of a heating element when energized (e.g., by application of a current pulse). In some embodiments, the sintering temperature is at least 500° C., for example, in a range of 1000-3000° C. In some embodiments, a temperature at a material being sintered within the furnace can match or substantially match (e.g., within 10%) the temperature of the heating element.

Inert gas: A gas that does not undergo a chemical reaction when subjected to the sintering temperature. In some embodiments, the inert gas is nitrogen, argon, helium, neon, krypton, xenon, radon, oganesson, or any combination of the foregoing.

Refractory material: A material (e.g., element or compound) having a melting temperature of at least 1000° C., for example, at least 1580° C. In some embodiments, a refractory material can be as defined in ASTM C71-01, "Standard Terminology Relating to Refractories," August 2017, which is incorporated herein by reference.

Refractory metal: A metal or metal alloy having a melting point of at least 1000° C., for example, at least 1850° C. In some embodiments, a refractory metal is one of niobium, molybdenum, tantalum, tungsten, rhenium, or an alloy thereof.

Metal: Includes those individual chemical elements classified as metals on the periodic table, including alkali metals, alkaline earth metals, transition metals, lanthanides, and actinides, as well as alloys formed from such metals, such as, but not limited to, stainless steel, brass, bronze, monel, etc.

INTRODUCTION

FIG. 1A shows an exemplary high-temperature sintering furnace system 100. The sintering furnace system 100 can have a housing 108 that comprises and/or defines an inlet 110, an outlet 112, and an internal volume 114 disposed between the inlet 110 and the outlet 112 along a direction of travel. In some embodiments, internal surfaces of housing 108 that define volume 114 can be formed of or coated with one or more low-emissivity materials (e.g., gold, chromium, zinc, copper, silver, aluminum, silicon, lead, etc.), which materials may help improve the efficiency of furnace 100. The inlet 110 can define an opening with a height, $t_i$ (e.g., in a direction perpendicular to the direction of travel), and the outlet 112 can define an opening with a height, $t_o$ (e.g., in a direction perpendicular to the direction of travel). In some embodiments, the inlet height, $t_i$, and/or the outlet height, $t_o$, can be selected to be as small as possible while still allowing to-be-sintered materials to enter without contacting the inlet 110 and sintered materials to exit without contacting the outlet 112.

A heating element 116 can be disposed within the internal volume 114 of the housing 108 at a location between the inlet 110 and the outlet 112 (e.g., substantially midway between the inlet and outlet along a direction of travel). The heating element 116 can subject a heating zone 124 to a thermal shock profile, for example, as described in further detail below with respect to FIGS. 3A-3B. In some embodiments, the heating element is a Joule heating element, for example, formed of carbon, graphite, metal, or any combination thereof. Electrical contact between an electrical power source 118 (e.g., a current source, such as a waveform generator) and the heating element 116 can be made by wiring extending through respective feedthroughs or pass-throughs 120*a*, 120*b* (e.g., formed of refractory material). A controller 122 can be operatively coupled to the current source 118 to control operation thereof, for example, to control the current source 118 to apply a current pulse to the heating element 116 that subjects the heating zone 124 to the thermal shock profile. Instead Joule heating or in addition thereto, in some embodiments, the heating element can comprise any other heating source capable of producing a thermal shock profile, for example, a microwave heating source, a laser, an electron beam device, a spark discharge device, or any combination thereof.

Figure 9:
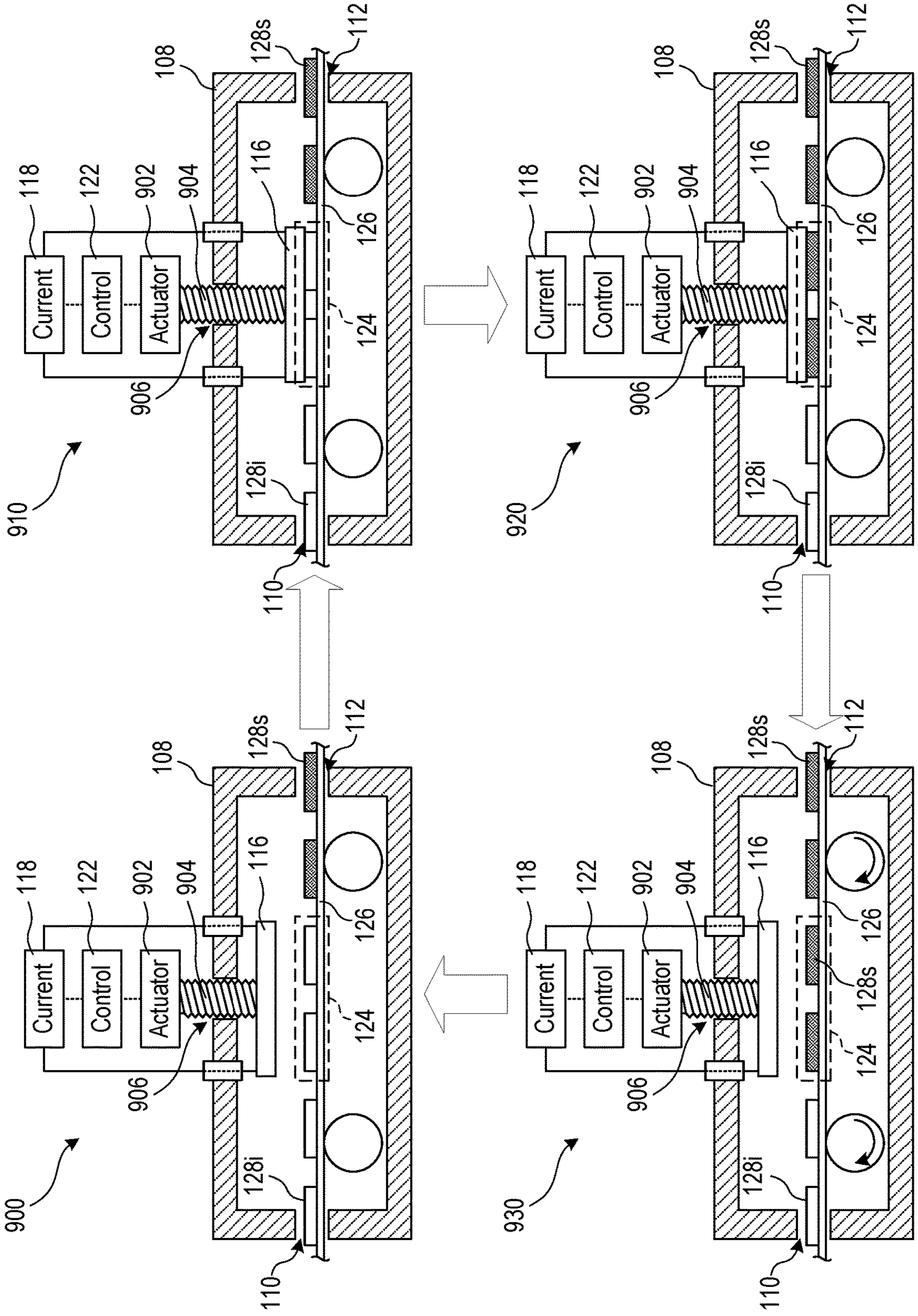
FIG. 9 are a series of simplified cross-sectional diagrams illustrating operations of an exemplary high temperature sintering furnace employing heating and pressing, according to one or more embodiments of the disclosed subject matter.

In the illustrated example of FIG. 1A, the heating element 116 is spaced from a to-be-sintered material in heating zone 124 by a gap, g (e.g., a minimum spacing between the heating element and a top surface of the to-be-sintered material and/or a sintered material along a direction perpendicular to a direction of material travel), for example, to provide radiative heating. Alternatively or additionally, the heating element 116 can be moved into contact with the to-be-sintered material so as to provide conductive heating. For example, an actuator (e.g., as shown in FIG. 9) can be provided to displace the heating element 116 toward (e.g., to decrease gap, g, to zero) the to-be-sintered material for purposes of thermal shock heating and then away (e.g., to increase gap, g, to a safe distance) from the sintered material for purposes of transporting the material out of the housing. Although the example of FIG. 1A shows only a single heating element 116, embodiments of the disclosed subject matter are not limited thereto. Rather, multiple heating elements can be provided, for example, to offer serial heating (e.g., by placing heating elements at different locations along a travel direction through the housing 108) and/or parallel heating (e.g., by placing heating elements on opposite sides of the to-be-sintered material) according to one or more contemplated embodiments.

In the illustrated example of FIG. 1A, the internal volume 114 is substantially open, for example, with a considerable distance between an internal sidewall of the housing 108 that defines the internal volume 114 and components traveling through the housing 108 (e.g., conveyor belt 102). For example, in some embodiments, a size of internal volume 114 can be at least an order of magnitude (e.g., at least 10 times, such as at least 100 times) greater than a volume of heating zone 124 (e.g., regions that are within 10% of the sintering temperature during the thermal shock). Alternatively or additionally, in some embodiments, the size of internal volume 114 can be at least $10^7$ greater than a volume of the heating element. For example, an electrical power of ~15 kW may be needed to maintain a temperature of ~3000° C. for a carbon-based Joule heater (e.g., having dimensions of about 10 cm×1 cm×0.2 cm) in a stainless-steel chamber or housing. Without cooling of the furnace or insulation, the temperature of an external wall of a housing can reach ~200° C. if the housing has a size of about 1.87 m×1.87 m×1.87 m (corresponding to a volume ratio of $3.4\times10^6$). In contrast, if the size of the chamber is increased to about 2.8 m×2.8 m×2.8 m (corresponding to a volume ratio of about $1.0\times10^7$), the temperature at an external wall of the housing can be kept at about 100° C.

Alternatively or additionally, a travel length $L_{travel}$ within the furnace housing 108 between the inlet 110 and the outlet 112 can be at least an order of magnitude (e.g., at least 10 times, such as at least 100 times) greater than a length $L_{HZ}$ of the heating zone 124. Such configurations may aid in the rapid cooling of the heating element 116 (e.g., and concomitant rapid cooling of the sintered material) at the conclusion of the thermal shock profile. Alternatively or additionally, in some embodiments, the size of the internal volume 114 can be reduced, for example, by insulation disposed between the heating zone 124 and the walls of the housing 108. Such insulation may be helpful in preventing the high temperatures reached during the thermal shock from being communicated to external surfaces of the housing 108 and/or the surrounding environment.

A transport assembly can be used to move materials to be sintered into internal volume 114 of housing 108 via the inlet 110 and sintered materials out of internal volume 114 of housing 108 via the outlet 112. For example, in some embodiments the transport assembly can comprise a conveyor belt 102 (e.g., a continuous belt), one or more drive rollers 104*a*, 104*b* (e.g., comprising or coupled to a rotational motor), and one or more support rollers 106*a*, 106*b* (e.g., passive rollers). In the illustrated example, the drive rollers 104*a*, 104*b* are maintained outside of housing 108 and thus can be insulated from the high temperatures generated within housing 108 during the thermal shock. Since support rollers 106*a*, 106*b* are disposed within housing 108, they can be formed of a refractory metal (e.g., tungsten). Alternatively, if support rollers 106*a*, 106*b* are spaced from enough from the heating zone 124, then they can be formed of non-refractory metal (e.g., stainless steel).

The conveyor belt 102 can be formed of a flexible material capable of withstanding one or more applications of the sintering temperature. For example, in some embodiments, the conveyor belt 102 can be formed of a carbon-based material, such as graphite. Alternatively, in some embodiments, the conveyor belt 102 can be formed of a material incapable of withstanding the sintering temperature (e.g., due to melting, carbonization, or other degrading effect). For example, in some embodiments, a conveyor belt can be formed of a polymer fabric. In such cases, the to-be-sintered material can be transferred from the conveyor belt to a high-temperature support (not shown) or a heating element surface within the heating zone, and any sintered materials can be transferred back to the conveyor belt for transport from the internal volume 114 (e.g., from the heating zone 124).

In operation, a to-be-sintered material 128*i* can be conveyed into the housing 108 via the inlet 110, and a sintered material 128*s* can be conveyed out of the housing 108 via the outlet 112. In some embodiments, the to-be-sintered material 128*i* can comprise nanoparticles and/or precursors (e.g., metals salts, such as chloride or hydrate forms of elemental metals). Alternatively or additionally, the to-be sintered material 128*i* can be provided on a substrate, such as a polymer film (e.g., green tape). In some embodiments, the combination of the to-be-sintered material 128*i* (and any substrate) with the conveyor belt 102 can have a maximum thickness, $t_m$, that is slightly less than the inlet thickness $t_i$ and/or the outlet thickness $t_o$. For example, the inlet thickness $t_i$, the outlet thickness $t_o$, or both can be at least 10% greater than thickness $t_m$, which may help prevent the surroundings of housing 108 from being exposed to the high temperatures within the housing 108. Alternatively or additionally, in some embodiments, the inlet thickness $t_i$, the outlet thickness $t_o$, or both can be no more than double the thickness $t_m$.

Although a specific configuration for the transport assembly is illustrated in FIG. 1A, other configurations are also possible according to one or more contemplated embodiments. For example, one or both of support rollers 106*a*, 106*b* can be eliminated, or additional support rollers within or outside of housing 108 can be provided. In another example, one or more drive rollers can be provided within housing 108, in addition to or in place of drive rollers 104*a*, 104*b*. Moreover, although a continuous conveyor belt 102 is employed in the example of FIG. 1A, in some embodiments, a transport assembly can instead employ a roll-to-roll processing configuration.

Figure 1B:
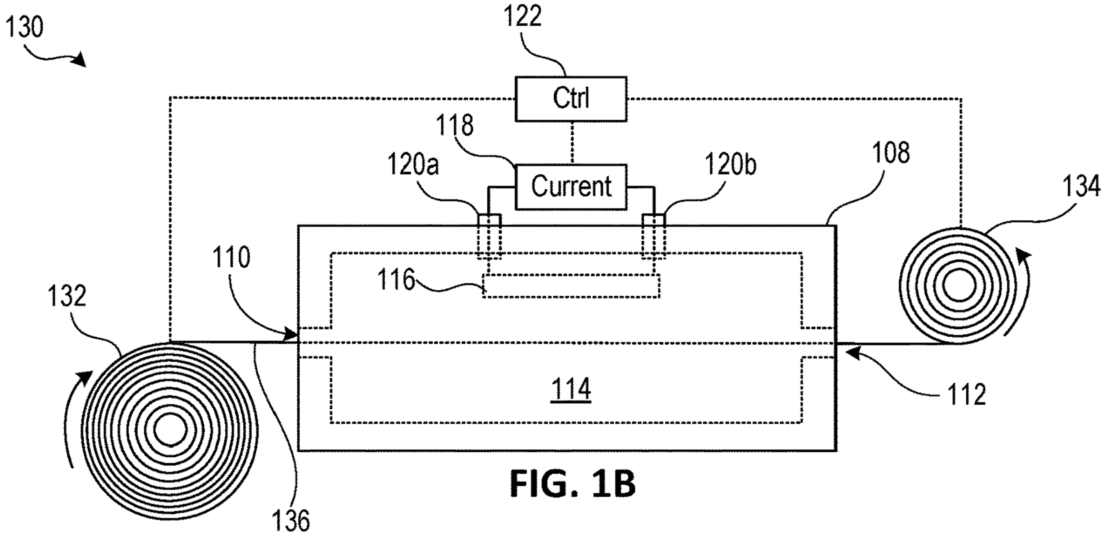
FIG. 1B is a simplified cross-sectional diagram of a roll-to-roll processing system employing a high temperature sintering furnace, according to one or more embodiments of the disclosed subject matter.

For example, FIG. 1B illustrates an exemplary sintering furnace system 130 having a roll-to-roll configuration, where a supply roll 132 unrolls to feed a conveyor material 136 to inlet 110, while processed conveyor material 136 from outlet 112 is wound onto an output roll 134. In some embodiments, the conveyor material 136 can comprise the to-be-sintered material (e.g., one or more precursors, for example, in a substantially solid form). Alternatively or additionally, the conveyor material 136 can serve as a support for the to-be-sintered material thereon, for example, with one or more precursors pre-loaded onto at least one surface of the conveyor material 136 and wound around supply roll 132, where the at least one surface will face heating element 116 once fed into the heating zone. Alternatively or additionally, the conveyer material 136 can support the to-be-sintered material therein, for example, with one or more precursors (e.g., nanoparticles) on fibers (e.g., carbon nanofibers) forming the conveyor material.

In the examples of FIGS. 1A-1B, the housing 108 has an inlet 110 separate from the outlet 112, and the conveyor belt or material extends through the internal volume 114 between the inlet 110 and outlet 112. However, in other embodiments, a single port can be used to provide to-be-sintered material to the heating zone and to remove sintered material therefrom. Such single port configurations can enhance the efficiency of the system, for example, by minimizing openings through which heat could escape from the internal volume of the housing and/or impurities could enter into the internal volume from outside the housing.

Figure 1C:
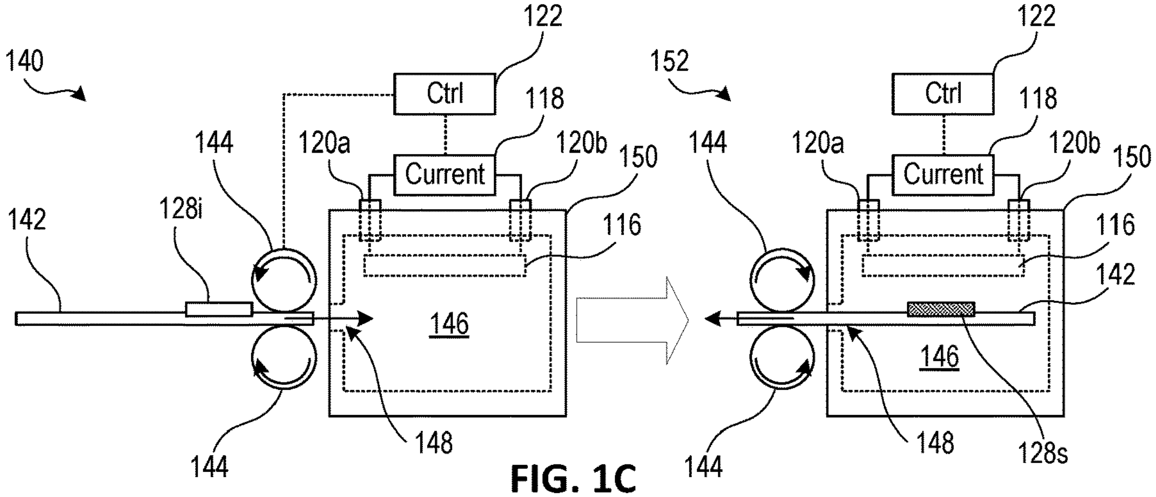
FIG. 1C is a simplified cross-sectional of another high temperature sintering furnace employing a single port for inlet and outlet, according to one or more embodiments of the disclosed subject matter.

For example, FIG. 1C illustrates an exemplary single port sintering furnace system in a loading/unloading stage 140 and a sintering stage 152. Similar to the above-described examples, a housing 150 defines an internal volume 146 in which a heating element 116 is provided. However, housing 150 includes a single inlet/outlet port 148 through which material is introduced and then later removed from the internal volume 146. The to-be-sintered material 128*i* can be disposed on a material support member 142 (e.g., a rigid substrate), which can be displaced laterally through the inlet/outlet port 148 via an actuation assembly 144 to position the material 128*i* for sintering, as shown at sintering stage 152. In the illustrated example, actuation assembly 144 employs a pair of rollers that rotate about an axis perpendicular to the drawing page. Alternatively, in some embodiments, actuation assembly an employ a rotary stage, where actuation thereof rotates member 142 about an axis parallel to the drawing page (e.g., parallel to the gap, g, between the heating element and the material in the heating zone).

Figure 3A:
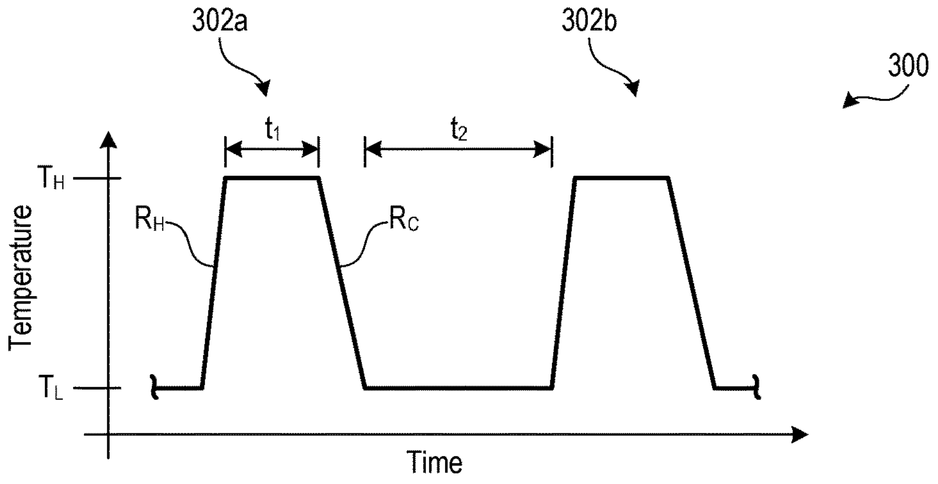
FIG. 3A is a graph of an exemplary temperature profile for a heating element of a high temperature sintering furnace, according to one or more embodiments of the disclosed subject matter.

In any of the disclosed examples, the heating element can subject materials in the heating zone to a thermal shock profile. For example, controller 122 can control electrical power source 118 to apply a short-duration current pulse to the heating element 116 that causes the heating element to rapidly increase to the sintering temperature, dwell at the sintering temperature for a predetermined sintering time period, and then rapidly cool from the sintering temperature. For example, FIG. 3A shows a temperature profile 300 that can be generated by the heating element to perform a thermal shock process. During a first sintering stage 302*a*, a sintering temperature $T_H$ (e.g., at least 500° C., such as in a range of 1000-3000° C., inclusive, for example, ~2000° C. or greater) can be provided for a relatively short time period $t_i$ (e.g., less than or equal to 60 s, such as in a range of about 1 μs to 10 s, inclusive, for example, ~10 s). In some embodiments, the high temperature can be sufficient to melt all of the constituent precursor materials and/or induce high temperature uniform mixing. In some embodiments, the temperature profile 300 can provide a rapid transition to and/or from the sintering temperature $T_H$. For example, the temperature profile 300 can exhibit a heating ramp rate $R_H$ (e.g., to sintering temperature $T_H$ from a base temperature $T_L$, such as room temperature (e.g. 20-25° C.) or an elevated ambient temperature (e.g., 100-200° C.)) of at least $10^{2}$° C./s, such as $10^{3}$-$10^{4}$° C./s, inclusive. The temperature profile 300 can further exhibit a cooling ramp rate $R_C$ (e.g., to a base temperature $T_L$ from sintering temperature $T_H$ and/or from the sintering temperature $T_H$ to a melting temperature of one or more of the constituent materials of the precursors) of at least $10^{2}$° C./s, such as $10^{3}$-$10^{4}$° C./s, inclusive. For example, the systems and methods for thermal shock can be similar to those disclosed in U.S. Publication No. 2018/0369771, entitled "Nanoparticles and systems and methods for synthesizing nanoparticles through thermal shock," U.S. Publication No. 2019/0161840, entitled "Thermal shock synthesis of multielement nanoparticles," International Publication No. WO 2020/236767, entitled "High temperature sintering systems and methods," and International Publication No. WO 2020/252435, entitled "Systems and methods for high temperature synthesis of single atom dispersions and multi-atom dispersions," all of which are incorporated by reference herein.

In some embodiments, the thermal shock exposure can be performed in a batch manner, for example, where the materials are conveyed to the heating zone, maintained substantially stationary during exposure to the sintering temperature, and then conveyed out of the heating zone during or after cooling. In such embodiments, the temperature profile 300 can include a subsequent sintering stage 302*b*, which may be substantially identical but temporally offset from the first sintering stage 302*a* by a delay $t_2$. In some embodiments, the delay $t_2$ can equivalent to or greater than a time period for removing the sintered material (or set thereof) from the heating zone and/or introducing the next to-be-sintered material (or set thereof) into the heating zone. In some embodiments, $t_2$ may be less than (e.g., at least an order of magnitude less than) the sintering time period $t_1$. Alternatively or additionally, $t_2$ can be substantially equal to $t_1$ or greater than $t_1$.

Alternatively, in some embodiments, the thermal shock exposure can be performed in a continuous manner, for example, where the materials are conveyed into and through the heating zone at the same time the heating element provides the thermal shock profile. In such embodiments, the transit time through the heating zone and the thermal shock profile can be coordinated to ensure that each material passing through the heating zone is exposed to the sintering temperature for a cumulative amount of time substantially equivalent to a desired sintering time (e.g., less than a predetermined maximum time). Alternatively or additionally, the thermal shock exposure can be produced, at least in part, by transit of the material through the heating zone (e.g., where $t_1 = L_{HZ} \div$(the transport velocity of the material through the heating zone)).

Figure 3B:
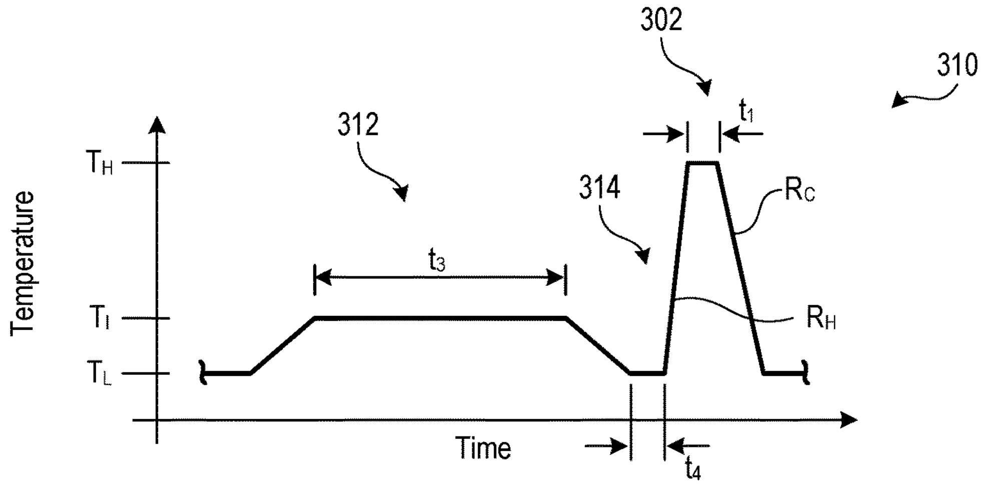
FIG. 3B is a graph of an exemplary multi-temperature profile for a substrate carrying a material to be sintering, according to one or more embodiments of the disclosed subject matter.

In some embodiments, the to-be-sintered material can be subjected to a preparatory temperature profile prior to the thermal shock profile, for example, to prepare the precursor materials and/or a substrate supporting the precursor materials for subsequent thermal shock. For example, FIG. 3B shows a multi-stage temperature profile 310 experienced by a material to be sintered. In a preheating stage 312, the material can be subjected to an intermediate temperature, $T_1$, for a duration $t_3$. In some embodiments, the preheating stage 312 may be a carbonization stage, where the intermediate temperature $T_1$ is sufficient to cause a substrate supporting the to-be-sintered material thereon to be carbonized. For example, the intermediate temperature $T_1$ can be in a range of 200-500° C., inclusive. In some embodiments, the intermediate temperature $T_1$ is a base temperature within the sintering furnace housing but outside the heating zone. Alternatively or additionally, the intermediate temperature $T_1$ could be generated by a separate heating element within the sintering furnace, for example, disposed along a travel path between the inlet and the sintering heating zone. Alternatively or additionally, the intermediate temperature $T_1$ could be generated by a separate heating element outside the sintering furnace, for example, in a separate housing upstream of the inlet of the sintering furnace housing or simply external to the sintering furnace housing prior to the inlet.

In some embodiments, the duration $t_3$ of the preheating stage 312 can be greater than the sintering duration $t_1$ and/or the transfer duration $t_2$. Alternatively, the duration $t_3$ of the preheating stage 312 can be less than either or both of $t_1$ and $t_2$. In some embodiments, the duration $t_3$ of the preheating stage 312 can be substantially equal to $t_1$, for example, when carbonization of an upstream substrate occurs simultaneously with sintering of materials on a downstream substrate. Alternatively, in some embodiments, the duration $t_3$ of the preheating stage 312 can be substantially equal to $t_2$, for example, when carbonization of a substrate occurs while it is en route to the heating zone.

In some embodiments, after the preheating stage 312, the material can pass through a transfer stage 314 before passing to the sintering stage 302. For example, the transfer stage 314 can correspond to the time for the material to move from a preheating region (e.g., a housing upstream of the sintering furnace, or a zone within the furnace but upstream of the sintering heating zone) to the sintering heating zone. In some embodiments, a duration $t_4$ of the transfer stage 314 can be substantially equal to $t_2$, for example, when an upstream material is moved out of the preheating zone at a same time as a downstream substrate is moved out of the sintering heating zone. Alternatively or additionally, a duration $t_4$ of the transfer stage 314 may zero or close to zero, for example, where the sintering stage 302 proceeds directly from the intermediate temperature $T_1$ rather than base temperature $T_L$.

Computer Implementation

Figure 2:
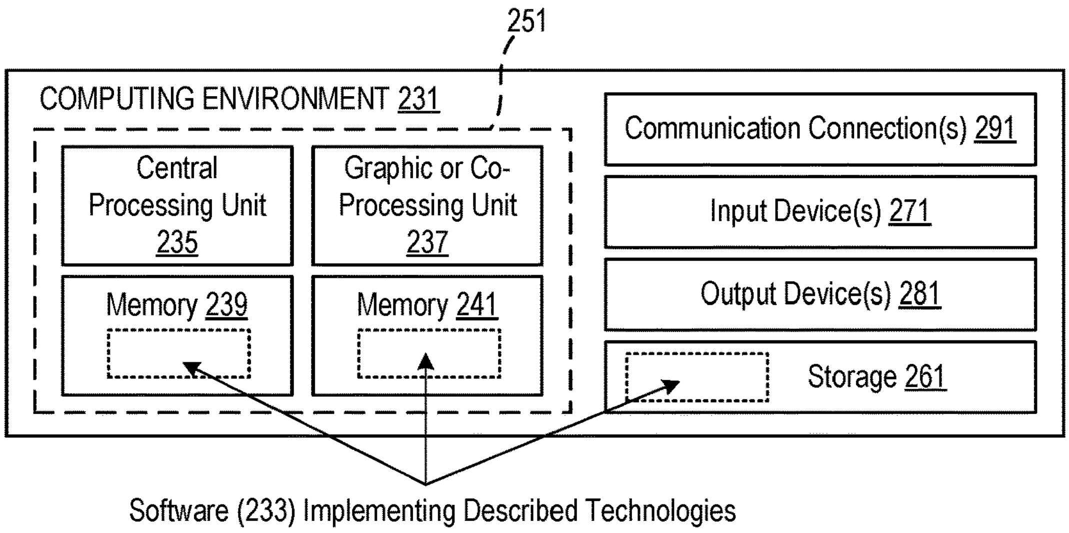
FIG. 2 depicts a generalized example of a computing environment in which the disclosed technologies may be implemented.

FIG. 2 depicts a generalized example of a suitable computing environment 231 in which the described innovations may be implemented, such as aspects of controller 122 and/or methods of operation of any of the disclosed sintering furnace systems. The computing environment 231 is not intended to suggest any limitation as to scope of use or functionality, as the innovations may be implemented in diverse general-purpose or special-purpose computing systems. For example, the computing environment 231 can be any of a variety of computing devices (e.g., desktop computer, laptop computer, server computer, tablet computer, etc.).

The computing environment 231 includes one or more processing units 235, 237 and memory 239, 241. In FIG. 2, this basic configuration 251 is included within a dashed line.

The processing units 235, 237 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 2 shows a central processing unit 235 as well as a graphics processing unit or co-processing unit 237. The tangible memory 239, 241 may be volatile memory (e.g., registers, cache, RAM), non-volatile memory (e.g., ROM, EEPROM, flash memory, etc.), or some combination of the two, accessible by the processing unit(s). The memory 239, 241 stores software 233 implementing one or more innovations described herein, in the form of computer-executable instructions suitable for execution by the processing unit(s).

A computing system may have additional features. For example, the computing environment 231 includes storage 261, one or more input devices 271, one or more output devices 281, and one or more communication connections 291. An interconnection mechanism (not shown) such as a bus, controller, or network interconnects the components of the computing environment 231. Typically, operating system software (not shown) provides an operating environment for other software executing in the computing environment 231, and coordinates activities of the components of the computing environment 231.

The tangible storage 261 may be removable or non-removable, and includes magnetic disks, magnetic tapes or cassettes, CD-ROMs, DVDs, or any other medium which can be used to store information in a non-transitory way, and which can be accessed within the computing environment 231. The storage 261 can store instructions for the software 233 implementing one or more innovations described herein.

The input device(s) 271 may be a touch input device such as a keyboard, mouse, pen, or trackball, a voice input device, a scanning device, or another device that provides input to the computing environment 231. The output device(s) 271 may be a display, printer, speaker, CD-writer, or another device that provides output from computing environment 231.

The communication connection(s) 291 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Heating Element Configurations

Figure 4A:
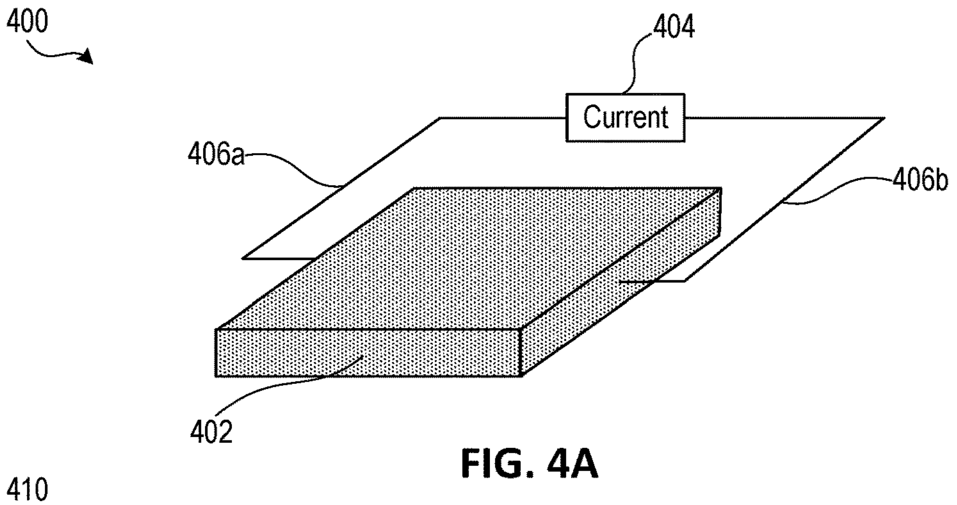
FIG. 4A is a simplified perspective view of a heating element for a high temperature sintering furnace, according to one or more embodiments of the disclosed subject matter.

In some embodiments, a heating assembly of a sintering furnace system can comprise a Joule heating element, an electrical power source, and electrical wiring coupling the Joule heating element to the electrical power source. For example, FIG. 4A illustrates a heating assembly 400 with a Joule heating element 402. Electrical power source 404 (e.g., current source) can be electrically connected to opposite ends of the Joule heating element 402 by respective wirings **406*a*, 406*b*. In some embodiments, the Joule heating element 402** can be composed of conductive carbon materials, such as carbon nanofibers, carbon paper, carbon felt, carbon cloth, graphite paper, graphite felt, graphite cloth, graphite film, and/or graphite plate.

Alternatively or additionally, the Joule heating element 402 can be composed of other conductive materials, such as a refractive metal (e.g., tungsten). Although FIG. 4A illustrates Joule heating element formed as a rectangular sheet or film (e.g., having a width of about 2 cm and a length of about 10 cm), other shapes (e.g., regular or arbitrary shapes) are also possible according to one or more contemplated embodiments. In some embodiments, the heating element 402 can ramp up from room temperature to the sintering temperature in approximately thirty seconds or less, followed by approximately ten seconds of sintering time, and then rapid cooling of approximately five seconds.

Figure 4B:
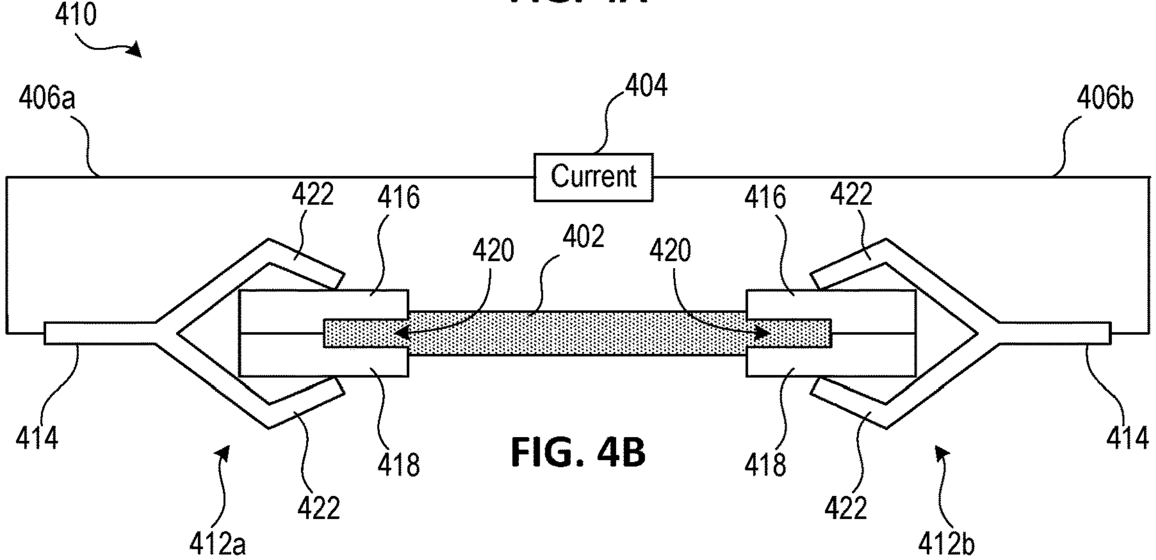
FIGS. 4B-4C are simplified cross-sectional and partial perspective views, respectively, of a heating element with exemplary electrical connections for a high temperature sintering furnace, according to one or more embodiments of the disclosed subject matter.
Figure 4C:
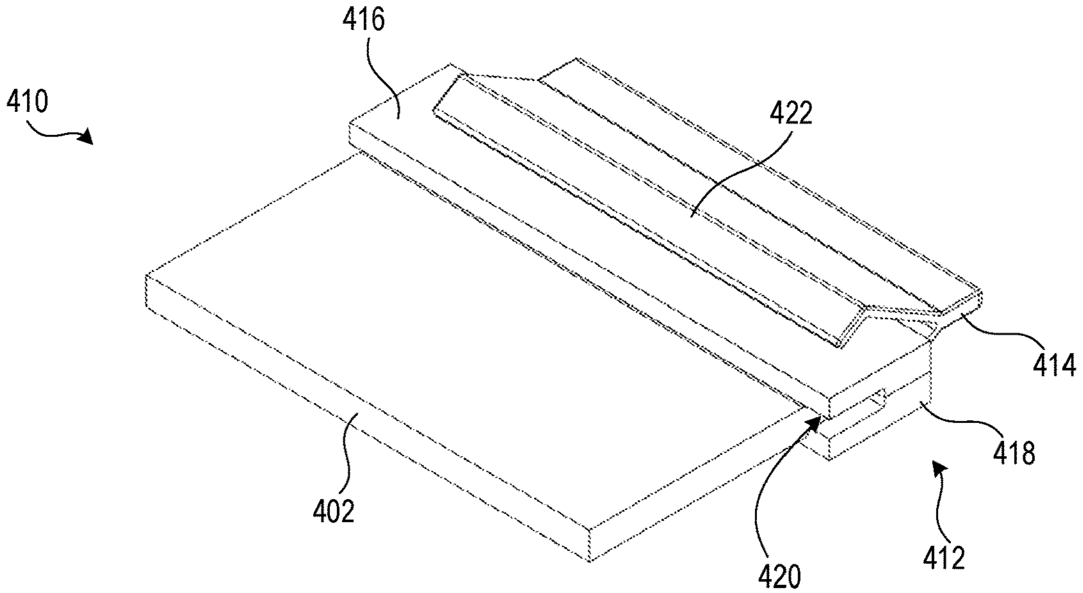

In some embodiments, the heating assembly can include features that compensate for mechanical variations induced by the thermal shock profile, for example, thermal expansion of the heating element resulting from heating to the sintering temperature and the subsequent thermal contraction resulting from cooling from the sintering temperature. For example, FIGS. 4B-4C illustrate an exemplary heating assembly 410 with electrical coupling assemblies 412*a*, 412 for accommodating changes in size/shape of the heating element 402 induced by the thermal shock profile. For example, each electrical coupling assembly 412*a*, 412*b* can include a biasing clip 414 with a pair of angled members or arms 422. The electrical coupling assemblies 412*a*, 412*b* can further include a pair of conductive plates 416, 418, which together sandwich an end portion of the heating element 402 within a recess 420 therebetween. The angled arms 422 of each biasing clip 414 can be effective to urge the plates 416, 418 together to reliably clamp onto the end portion of the heating element 402. For example, a height of recess 420 can be less than a thickness of the heating element 402, such that the plates 416, 418 partially compress and grip onto the end portion of the heating element 402. In some embodiments, the components of the electrical coupling assembly can be conductive, for example, such that electrical connection from the electrical power source 404 to the heating element 402 can be made by connecting the electrical wirings 406*a*, 406*b* to respective biasing clips 414. For example, each biasing clip 414 can be formed of a metal (e.g., copper, copper-coated stainless steel, etc.), and each plate 416, 418 can be formed of a conductive carbon-based material, such as graphite. In some embodiments, the wiring 406*a*, 406*b* can be formed of a refractory metal, such as tungsten or a combination of copper and silver. The configuration of coupling assemblies 412*a*, 412*b* can be effective to allow for expansion/contraction of the heating element while maintaining good electrical contact thereto, as well as at least partially insulate the metal wiring and/or metal clips from the high temperatures generated by the heating element that may otherwise melt or degrade the constituent metals.

Two-Stage Heating Configurations

Figure 5A:
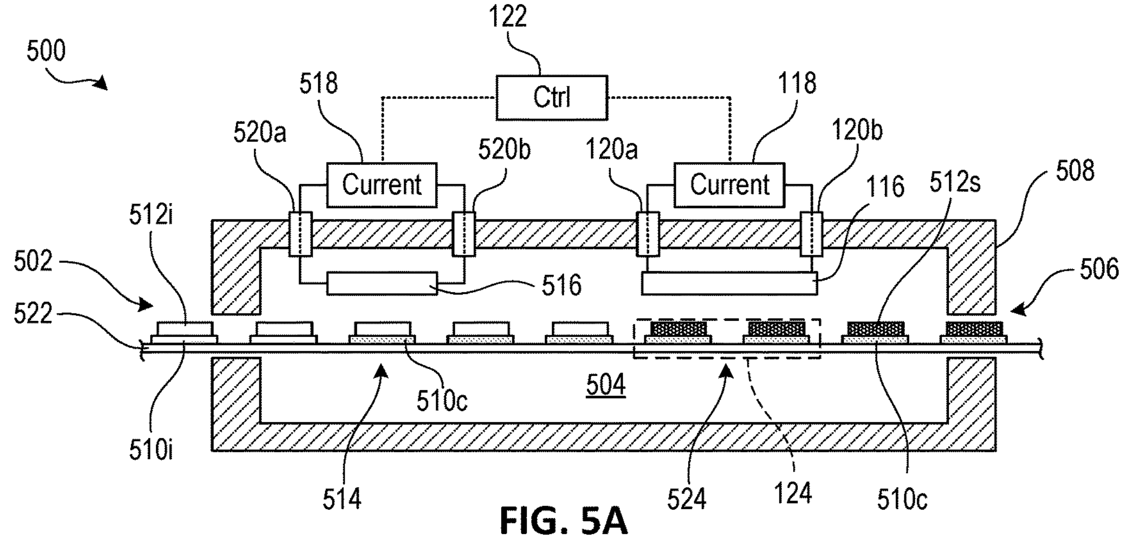
FIG. 5A is a simplified cross-sectional diagram of an exemplary two-stage heating system employing a single furnace, according to one or more embodiments of the disclosed subject matter.

In some embodiments, multiple heating stages can be provided within the same furnace housing, for example, to provide pre-heating (e.g., for substrate carbonization, for precursor drying, or for any other purpose). For example, FIG. 5A illustrates a two-stage sintering furnace system 500, which can have a housing 508 that comprises and/or defines an inlet 502, an outlet 506, and an internal volume 504 disposed between the inlet 502 and the outlet 506 along a direction of travel. In operation, a conveyor belt 522 can be used to transport a to-be-sintered material 512*i* on a substrate 510*i* (e.g., a polymer film) into the internal volume 504 of the housing 508 via inlet 502. The substrate 510*i* and precursor material 512*i* can be positioned by conveyor belt 522 at a preheating stage 514, for example, within the heating zone of a first heating element 516. In some embodiments, the preheating stage 514 can be effective to convert the substrate into a carbonized material 510*c*. After the preheating stage 514, the conveyor belt 522 can reposition carbonized material 510*c* and precursor material 512*i* at a sintering stage, for example, within the heating zone 124 of sintering heating element 116. In some embodiments, the sintering stage 524 can be effective to convert the precursor material 512*i* into a sintered material 512*s*.

For example, in some embodiments, the first heating element 516 can be a Joule heating element operatively coupled to an electrical power source 518 (which may be different from or integrated with electrical power source 118 that drives the sintering heating element 116) via wiring that passes through respective electrical conductor feedthroughs or pass-throughs 520*a*, 520*b*. Alternatively, in some embodiments, the first heating element 516 can employ another type of heating mechanism, for example, capable of generating temperatures less than 500° C. In some embodiments, controller 122 can control operation of the heating elements 516, 116 of both the preheating stage 514 and the sintering stage 524. Alternatively, in some embodiments, separate controllers can be provided for each stage 514, 524, with or without communication therebetween to coordinate operations thereof.

Figure 5B:
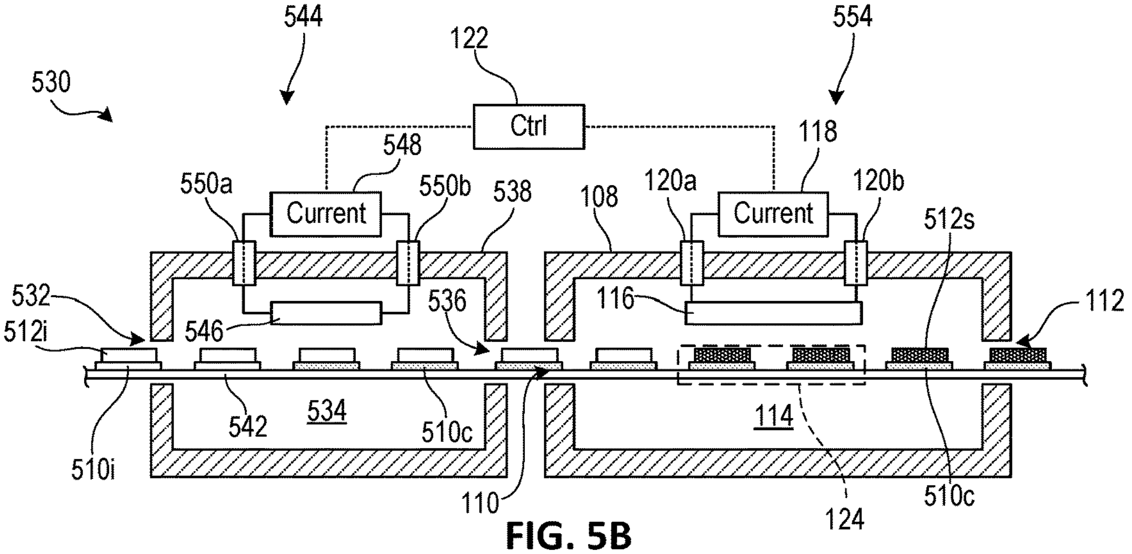
FIG. 5B is a simplified cross-sectional diagram of an exemplary two-stage heating system employing separate furnaces, according to one or more embodiments of the disclosed subject matter.

In some embodiments, multiple heating stages can be provided via serially-arranged furnace housings, for example, to providing initial pre-heating (e.g., for substrate carbonization, for precursor drying, or for any other purpose) followed by sintering. For example, FIG. 5B illustrates a two-stage sintering furnace system 500, which can have a first heating stage 544 (e.g., pre-heating stage) and a second heating stage 554 (e.g., sintering stage). The first heating stage 544 can include a first housing 538 that comprises and/or defines a first inlet 532, a first outlet 536, and a first internal volume 534 disposed between the first inlet 532 and the first outlet 536 along a direction of travel. In some embodiments, the second heating stage 554 can have a configuration (e.g., housing 108, sintering heating element 116, etc.) similar to the sintering furnace system 100 of FIG. 1A or any other sintering furnace system disclosed herein.

In operation, a conveyor belt 542 can be used to transport a to-be-sintered material 512*i* on a substrate 510*i* (e.g., a polymer film) into the first internal volume 534 of the first housing 538, for example, by conveying through inlet 532 and into position within the heating zone of first heating element 546. In some embodiments, the first heating stage 544 can be effective to convert the substrate into a carbonized material 510*c*. After the first heating stage 544, the conveyor blet 542 can transport the carbonized material 510*c* and precursor material 512*i* out of housing 538 via outlet 536 and into the inlet 110 of the housing 108 of the second heating stage 554, for example, to a position within the heating zone 124 of sintering heating element 116. In some embodiments, the sintering stage 554 can be effective to convert the precursor material 512*i* into a sintered material 512*s*.

For example, in some embodiments, the first heating element 546 can be a Joule heating element operatively coupled to an electrical power source 548 (which may be different from or integrated with electrical power source 118 that drives the sintering heating element 116) via wiring that passes through respective electrical conductor feedthroughs or pass-throughs 550*a*, 550*b*. Alternatively, in some embodiments, the first heating element 546 can employ another type of heating mechanism, for example, capable of generating temperatures less than 500° C. In some embodiments, controller 122 can control operation of the heating elements 546, 116 of both the first heating stage 544 and the second heating stage 554. Alternatively, in some embodiments, separate controllers can be provided for each stage 544, 554, with or without communication therebetween to coordinate operations thereof.

Multiple Heating Element Configurations

Figure 6:
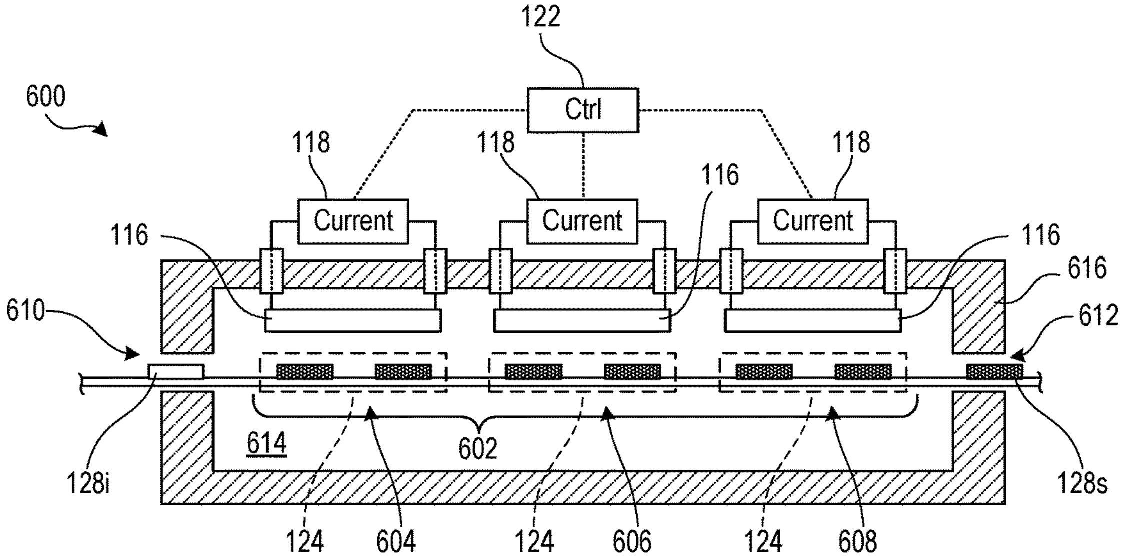
FIG. 6 is a simplified cross-sectional diagram of an exemplary batch processing system employing multiple heating elements in a single furnace, according to one or more embodiments of the disclosed subject matter.

In some embodiments, multiple heating elements can be provided within the same furnace housing, for example, to provide simultaneous or sequential batch processing of multiple to-be-sintered materials. For example, FIG. 6 illustrates a batch processing sintering furnace system 600, which can have a housing 616 that comprises and/or defines an inlet 610, an outlet 612, and an internal volume 614 disposed between the inlet 610 and the outlet along a direction of travel. The batch processing sintering furnace system 600 can also include multiple heating elements 116 disposed within the internal volume 614 and arranged, for example, such that the respective heating zones 124 are serially disposed along the direction of travel to form a first heating stage 604, a second heating stage 606, and a third heating stage 608. Although three heating stages 604-608 are shown in the example of FIG. 6, fewer or additional stages are also possible according to one or more contemplated embodiments.

In operation, a conveyor belt can be used to transport a batch of to-be-sintered materials **128*i* into the internal volume 614 via inlet 610. In the illustrated example of FIG. 6, two materials 128*i* are positioned within each heating zone 124; however, in some embodiments, fewer (e.g., one material 128*i*) or additional (e.g., three or more materials 128*i*) can be positioned within each heating zone 124. In some embodiments, to process the batch 602 of materials 128*i*, the heating elements 116 can be energized simultaneously to provide a thermal shock profile to the materials 128*i* in the respective heating zones 124 of stages 604-608, thereby forming multiple sintered materials 128*s* at the same time. Conveyor belt can then be used to transport the batch of sintered materials 128*s* out of the internal volume 614 via outlet 612, while loading a next batch of to-be-sintered materials 128*i* via inlet 610. Alternatively or additionally, in some embodiments, the heating stages 604-608 can operate at different times instead of in parallel, for example, where the heating element 116 of the first stage 604 providing a thermal shock profile to materials in its heating zone, followed by the heating element 116 of the second stage 606 providing a thermal shock profile to materials in its heating zone, and so on. Once all materials in the batch have been sintered, the conveyor belt can then used to transport the batch out of the housing 616** and/or to load the next batch for processing into the housing.

Cooling System Configurations

Because the thermal shock profile produces such high temperatures (e.g., 1000-3000° C.) within the sintering furnace housing, exterior surfaces of the housing may exhibit temperatures that could be detrimental to the surrounding environment and/or human operators (e.g., temperatures of 100° C. or more). Alternatively or additionally, the high temperatures of the thermal shock may compromise the integrity of the sintering furnace, for example, by subjecting the housing walls to temperatures that approach or exceed a melting temperature of its constituent material. Accordingly, in some embodiments, a cooling system can be provided to maintain a temperature of the sintering furnace wall and/or exterior surfaces of the housing at or less than a predetermined temperature.

Figure 7A:
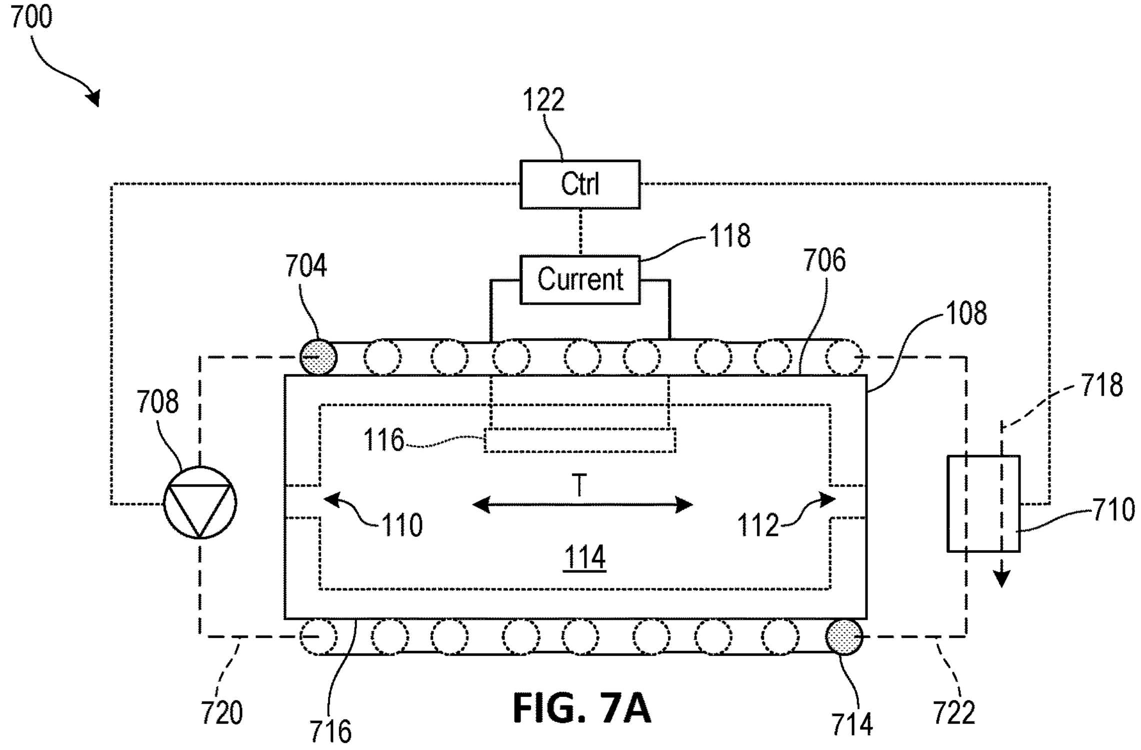
FIGS. 7A-7B are simplified cross-sectional diagrams of exemplary high temperature sintering furnaces with active cooling of external surfaces, according to one or more embodiments of the disclosed subject matter.

For example, FIG. 7A illustrates a sintering furnace system 700 employing a cooling system in thermal communication with external surfaces of housing 108. In the illustrated example, the cooling system can comprise a first fluid conduit 704 disposed adjacent to, on, or within a top surface 706 of housing 108, and a second fluid conduit 714 disposed adjacent to, on, or within a bottom surface 716 of housing 108. In some embodiments, additional conduits can be provided in thermal communication with other surfaces of the housing 108 (e.g., similar to the configuration of FIGS. 15A-15C). Alternatively or additionally, in some embodiments, fluid conduits can be provided on fewer surfaces of the housing 108 or portions thereof. In some embodiments, each fluid conduit 704, 714 can have a serpentine or meandering configuration, such that fluid flow therein can be in a direction orthogonal to, or at least crossing with, a direction of travel, T, of material within furnace housing 108. In some embodiments, the fluid flow through the conduits 704, 714 can comprise any type of heat transfer fluid, such as, but not limited to, water, oil, molten salt, etc.

In some embodiments, fluid can flow serially through conduits 704, 714, for example, using a hydraulic pump 708 that directs fluid from an outlet of first conduit 704 via inlet line 720 to second conduit 714 and fluid from an outlet of second conduit 714 is redirected via outlet line 722 to an inlet of first conduit 704. Alternatively, in some embodiments, fluid can flow in parallel through the conduits 704, 714, for example, where an output of the hydraulic pump 708 is simultaneously directed to respective inlets of the conduits 704, 714 and the discharge from outlets of the conduits 704, 714 is redirected to input of the hydraulic pump 708. In either the serial or parallel configurations, a direction of fluid flow through the first conduit 704 can be the same as that through the second conduit 714. Alternatively, the direction of fluid flow through the first conduit 704 can be opposite to that through the second conduit 714.

In some embodiments, controller 122 can control the cooling system in order to control operation thereof to maintain a temperature of the exterior of the housing 108 below a predetermined threshold (e.g., less than 100° C., or less than 50° C., or less than 30° C.), for example, based on a sensor (e.g., thermocouple, not shown) mounted on the exterior surface and/or based on using thermography of the exterior surface of the furnace housing. In some embodiments, the controller 122 can be operatively coupled to the hydraulic pump 708, for example, to control a fluid velocity through conduits 704, 714. In some embodiments, the output from one or more conduits can be directed to a heat exchanger 710 (e.g., a cross-flow heat exchanger), for example, to cool fluid in conduits 704, 714 by exchanging heat with a cooling fluid flow 718 (e.g., air, water, oil, etc.). In some embodiments, a heat dissipation device (e.g., a pin-fin heat sink, a straight fin heat sink, or a flared fin heat sink) can be used in addition to or in place of heat exchanger 710 to cool fluid in conduits 704, 714.

Figure 7B:
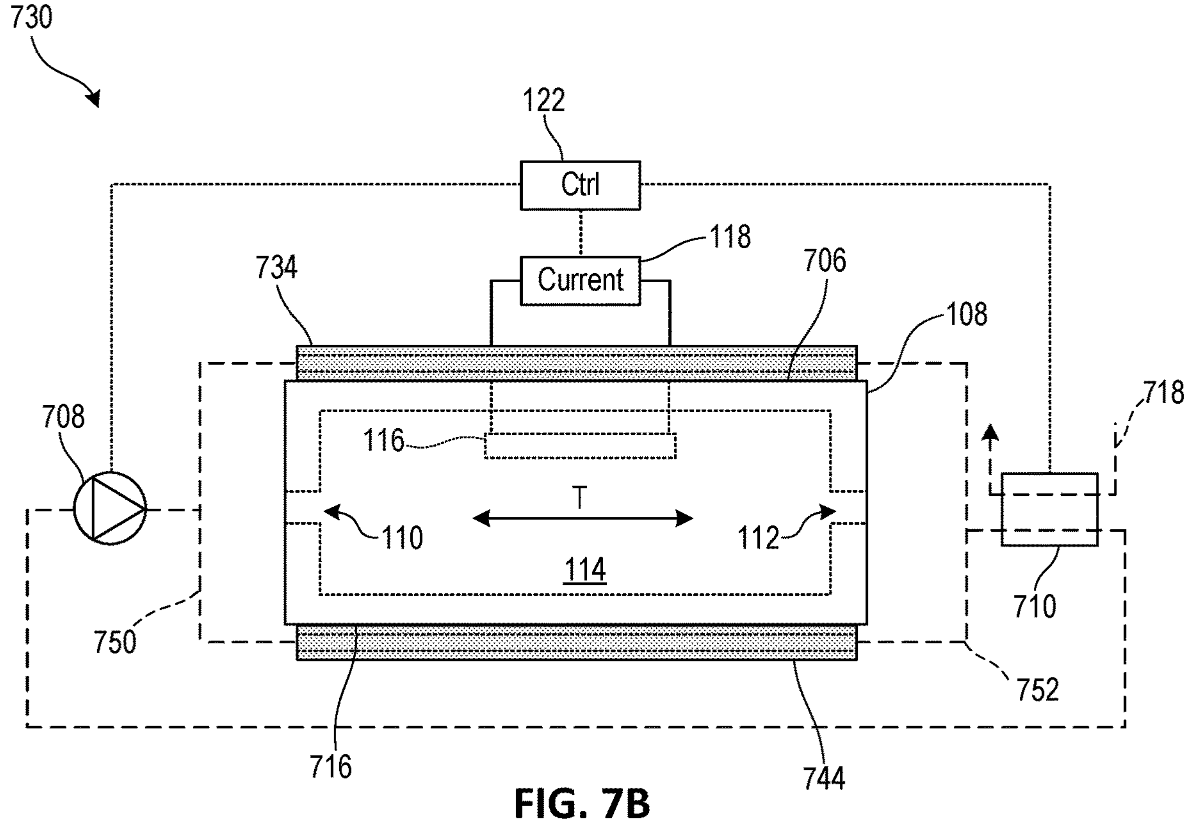

In the illustrated example of FIG. 7A, the conduits 704, 714 have a serpentine configuration; however, other conduit configurations are also possible according to one or more contemplated embodiments. For example, FIG. 7B illustrates a sintering furnace system 730 employing a cooling system with first and second fluid conduits 734, 744 disposed adjacent to, on, or within surfaces 706, 716, respectively. Each fluid conduit 734, 744 can have a substantially straight configuration, for example, extending parallel to a direction of travel, T, of material within the furnace housing 108. In some embodiments, fluid can flow in parallel through conduits 734, 744, for example, using hydraulic pump 708 to simultaneously direct fluid to inlets thereof via inlet line 750 and using an outlet line 752 to redirect fluid discharged from the conduits 734, 744 to the input of the pump 708. Alternatively, in some embodiments, fluid can flow serially through conduits 734, 744, for example, in a manner similar to that illustrated in FIG. 7A.

Shield Gas Configurations

Figure 8A:
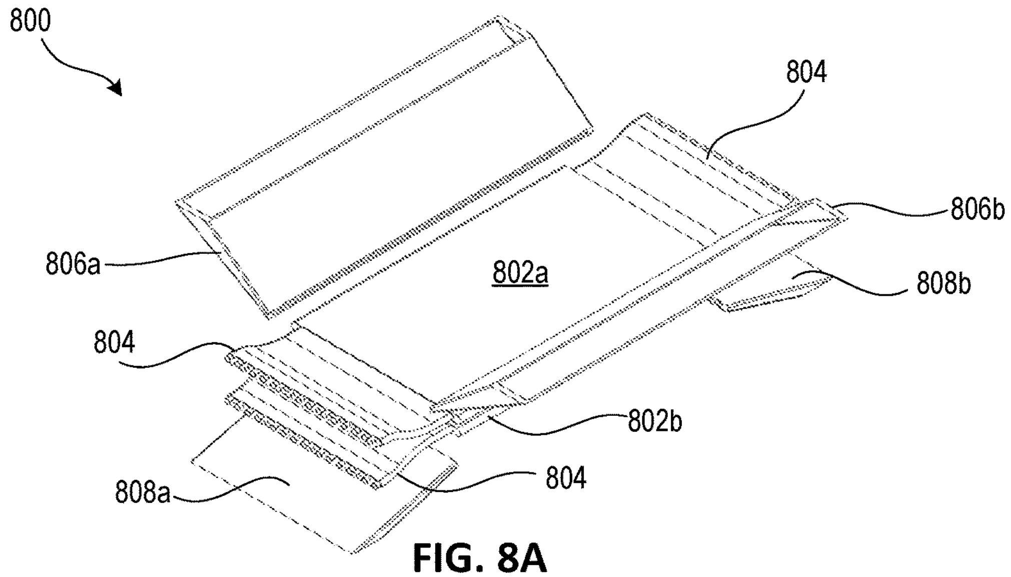
FIGS. 8A-8B are simplified perspective and cross-sectional views of heating elements with nozzles for shield gas flow, according to one or more embodiments of the disclosed subject matter.
Figure 8B:
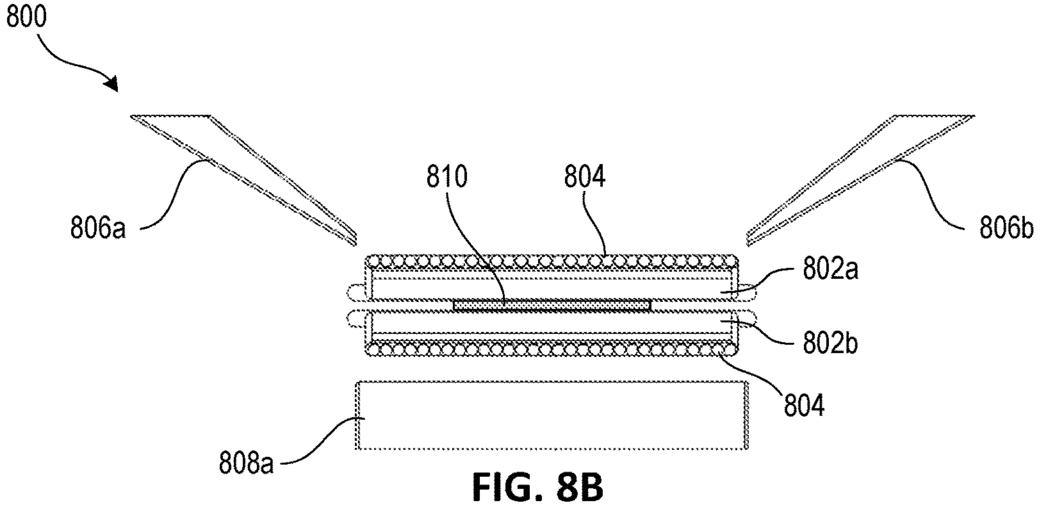

In some embodiments, a directed flow of inert gas can be provided to the internal volume of the sintering furnace, for example, to enhance a cooling rate at the end of a thermal shock profile, to increase a lifetime and/or enhance reliability of the heating element, to prevent contaminants from reaching the heating zone, the to-be-sintered material, and/or the sintered material, and/or for any other purpose. For example, FIGS. 8A-8B illustrate a heating assembly 800 formed by a pair of heating elements 802*a*, 802*b* on opposite sides of a to-be-sintered material 810. Electrical wiring 804 (e.g., formed of a refractory metal, such as tungsten) can extend from opposite sides of each heating element 802*a*, 802*b*, for example, perpendicular to a direction of travel of material 810. A first pair of shield gas nozzles 806*a*, 806*b* can be provided on opposite sides (e.g., with respect to a direction of material travel) of the first heating element 802*a*. A second pair of shield gas nozzles 808*a*, 808*b* can be provided on opposite sides (e.g., with respect to a direction orthogonal to the direction of material travel) of the second heating element 802*b*. In some embodiments, the shield gas nozzles 806*a*, 806*b*, 808*a*, 808*b* can be formed of a refractory material (e.g., tungsten or carbide).

Figure 8C:
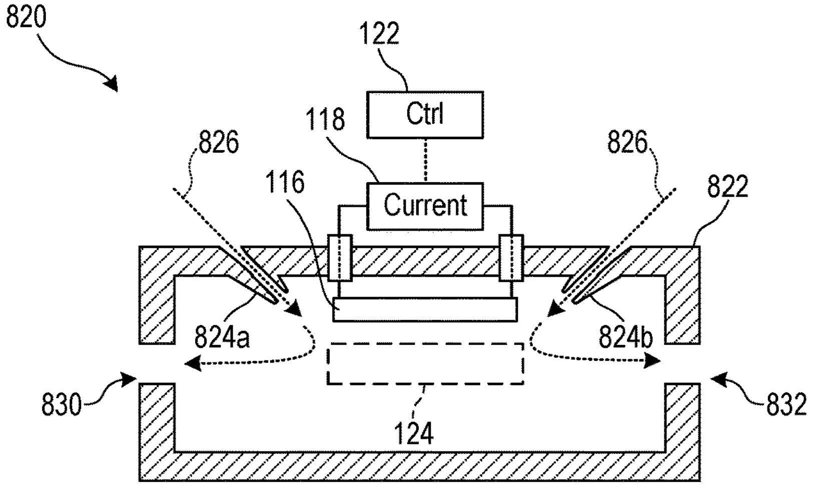
FIG. 8C is a simplified cross-sectional diagram of a high temperature sintering furnace with integrated nozzles for shield gas flow, according to one or more embodiments of the disclosed subject matter.

The second pair of shield gas nozzles 808*a*, 808*b* can have a different arrangement than the first pair of shield gas nozzles 806*a*, 806*b*, for example, to accommodate a conveyor belt extending between the heating elements 802*a*, 802*b* and/or transport of the material into and out of the heating zone between heating elements 802*a*, 802*b*. In some embodiments, the shield gas nozzles 806*a*, 806*b*, 808*a*, 808*b* can direct a flow of inert gas at a lateral end of the respective heating element 802*a*, 802*b* and/or at a back side (e.g., opposite a side facing to and/or contact with the to-be-sintered material 810) of the respective heating element 802*a*, 802*b*. Alternatively or additionally, in some embodiments, the flow of inert gas can be directed at the heating zone of the heater. For example, FIG. 8C illustrates an exemplary sintering furnace system 820 with a furnace housing 822 that comprises and/or defines an inlet 830, an outlet 832, and a pair of shield gas nozzles 824*a*, 824*b*. The shield gas nozzles 824*a*, 824*b* can be integrally formed with the housing 822 and arranged such that an inert gas flow 826 is directed toward heating zone 124 and exits the internal volume of the housing 822 via the inlet 830 or outlet 932, respectively. Other configurations for the shield gas nozzles and inert gas flow are also possible according to one or more contemplated embodiments.

Pressure Application Configurations

In some embodiments, the thermal shock profile can be applied contemporaneous with application of pressure, for example, via the heating element itself or by another component (e.g., formed of a refractory material) proximal or adjacent to the heating element within the furnace housing. For example, FIG. 9 illustrates operation of an exemplary sintering furnace system with pressing. In an initial transport stage 900, a to-be-sintered material 128*i* can be moved by conveyor 126 to the heating zone 124 within housing 108 via inlet 110. The heating element 116 can be mounted on a movable stage or actuation member 904 (e.g., a screw mechanism) that extends through pass-through 906 and is displaceable by an actuation assembly 902 (e.g., a rotary motor) controlled by controller 122. In the illustrated example, the actuation assembly 902 can be disposed external to housing 108 and the actuation member 904 can extend through pass-through 906; however, in some embodiments, the actuation member 904 and/or the actuation assembly 902 can be disposed within the housing 108. In addition, although FIG. 9 illustrates a particular type of actuation member and actuation assembly, other mechanisms for moving the heating element toward or away from the to-be-sintered material 128*i* are also possible according to one or more contemplated embodiments.

After transport stage 900, the operation proceeds to contact stage 910, where the actuation assembly 902 moves the heating element 116 toward the to-be-sintered material 128*i* in the heating zone 124. The operation can then proceed to sintering stage 920, where the heating element 116 is energized to subject the material 128*i* to a thermal shock profile (e.g., as shown in FIG. 3A), after which the heating element 116 is retracted by the actuation assembly 902 in the release stage 930. The operation can then return to transport stage 900 to repeat for the next set of to-be-sintered materials.

In some embodiments, the heating element 116 can be positioned in contact stage 910 so as to reduce the gap between heating element 116 and material 128*i*, as compared to the transport stage 900, for example, to provide radiative heating during the thermal shock profile. Alternatively, in some embodiments, the heating element 116 can be positioned in contact stage 910 so as to eliminate the gap between heating element 116 and material 128*i*, as compared to the transport stage 900, for example, to provide conductive heating during the thermal shock profile. Alternatively or additionally, in some embodiments, the heating element 116 can be positioned in contact stage 910 so as to compress material 128*i*. In some embodiments, conveyor 126 can be replaced by another heating element, which may be stationary or separately movable toward heating element 116. Alternatively or additionally, in some embodiments, conveyor 126 can be replaced by, or a portion thereof supported by, a high-temperature platen or support (e.g., formed of a carbon-based material or a refractory material), which may be stationary or separately movable toward heating element 116.

Integrated Heating and Conveyance Configurations

Figure 10:
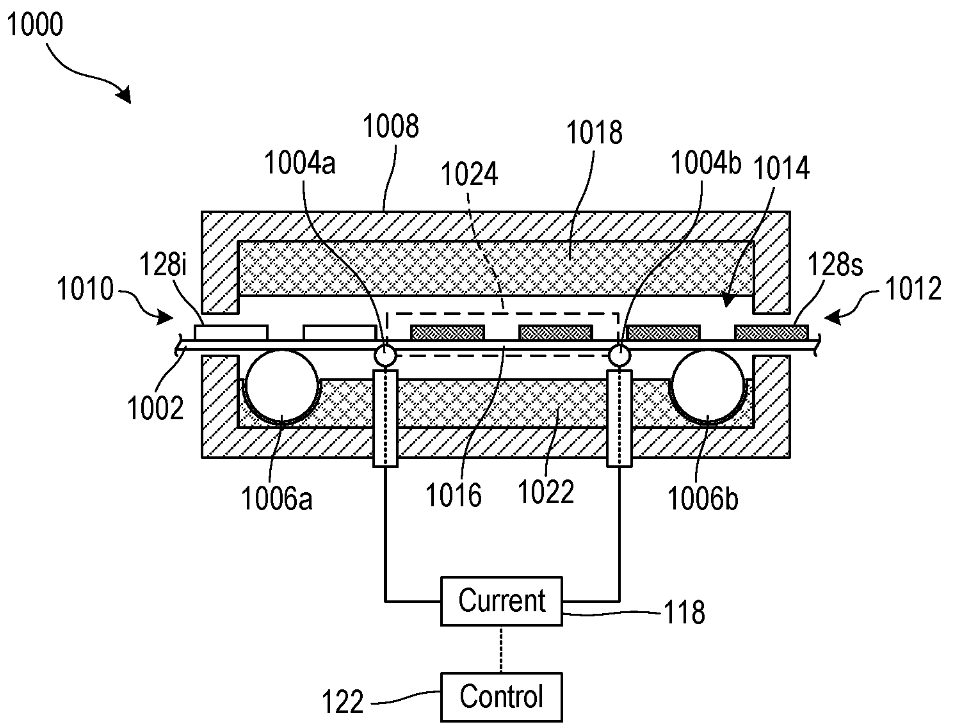
FIG. 10 is a simplified cross-sectional diagram of an exemplary high temperature sintering furnace employing a portion of a conveyor belt as a heating element, according to one or more embodiments of the disclosed subject matter.

In some embodiments, the heating element can be integrated with or be a part of the transport assembly. For example, FIG. 10 illustrates an exemplary sintering furnace system 1000 that employs a portion 1016 of conveyor belt 1002 as a heating element for subjecting material 128*i* within a heating zone 1024 to a desired thermal shock profile. In some embodiments, the portion 1016 can serve as a Joule heating element. In such embodiments, the conveyor belt can be formed of a conductive material, such as carbon, graphite, metal, or combinations thereof. Electrical interfaces 1004*a*, 1004*b* can be in electrical contact with the portion 1016 and configured to apply a current pulse thereto to effect the Joule heating. For example, the electrical interfaces 1004*a*, 1004*b* can comprise one or more conductive rollers, one or more slip ring interfaces, etc. In operation, the conveyor belt 1002 can extend between inlet 1010 and outlet 1012 of housing 1008 and can supported therein by support rollers 1006*a*, 1006*b* (e.g., disposed within the internal volume 1014 as shown and formed of a refractory metal, or disposed outside the housing and formed of a metal). In some embodiments, the housing can further include insulation 1018, 1022 on opposite sides of the conveyor belt 1002 within the internal volume 1014, for example, to protect walls of the furnace housing 1008 from excessive temperatures (e.g., when a size of the housing 1008 is less than 100 times of a volume of the heating zone).

The to-be-sintered material 128*i* can be transported to the heating zone 1024, where an electrical current passing through the portion 1016 between electrical interfaces 1004*a*, 1004*b* subjects the material 128*i* to the desired thermal shock profile. In some embodiments, the electrical current can be applied while the conveyor belt is static, for example, after the materials 128*i* have been moved into the heating zone. Alternatively or additionally, in some embodiments, the electrical current can be applied while the conveyor belt continues to move, for example, in a continuous manner. In such embodiments, the speed of the conveyor belt, the size of the heating zone 1024, and/or timing of the electrical current can be adapted such that, in combination, each material that passes through the heating zone 1024 is subjected to a respective thermal shock profile.

Exemplary Sintering Furnace Systems

Figure 11A:
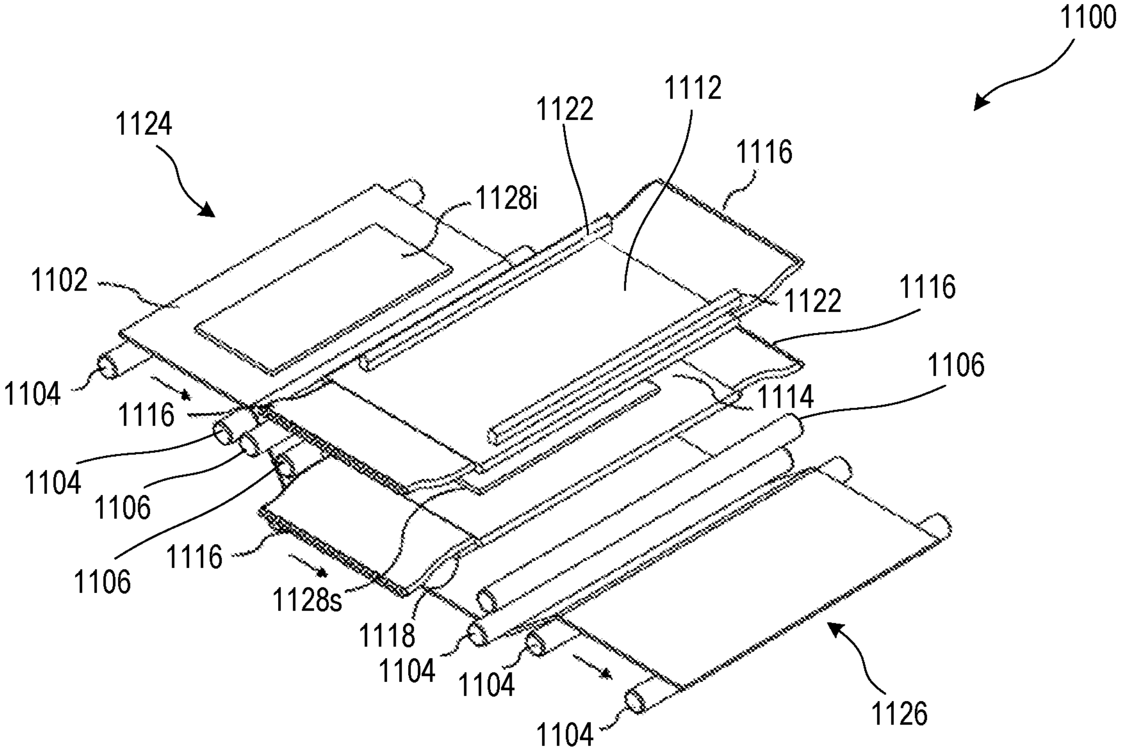
FIG. 11A is a simplified perspective diagram of a portion of an exemplary high temperature sintering furnace employing a pair of opposed heating elements and substrate transfer, according to one or more embodiments of the disclosed subject matter.
Figure 11B:
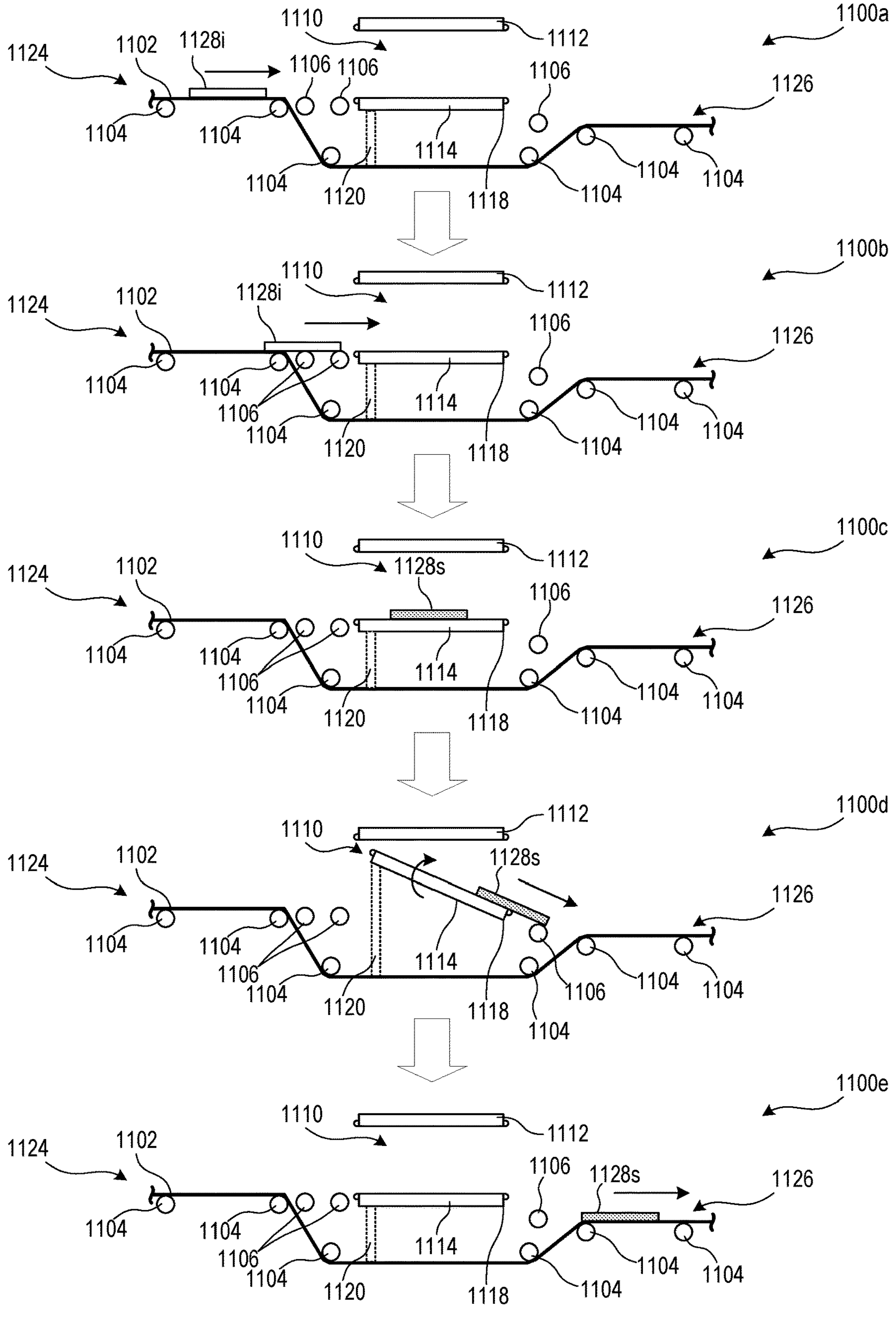
FIG. 11B is a series of simplified cross-sectional diagrams illustrating operations of the high temperature sintering furnace of FIG. 11A.

FIGS. 11A-11B show a high temperature sintering furnace system 1100 and operations thereof, for example, for roll-to-roll processing. The high temperature sintering furnace system 1100 employs a pair of opposed heating elements, for example, an upper heating element 1112 for providing radiative heating and a lower heating element 1114 for providing conductive heating to a to-be-sintered material carried by a conveyor film 1102 (e.g., formed of carbon) supported by rollers 1104 (e.g., formed of a metal, such as stainless steel). For example, the conveyor film 1102 can carry a substrate 1128*i* (e.g., green tape) with precursors from an inlet region 1124 toward a heating zone 1110, as shown at input stage 1100*a*. The substrate 1128*i* can be transferred by material transfer rollers 1106 (e.g., formed of a refractory metal, such as tungsten) from the conveyor film 1102 at transfer stage 1100*b*, and placed upon an upper surface of heating element 1114 at stage 1100*c*. The heating elements 1112, 1114 (e.g., Joule heating carbon strips) can rapidly heat the substrate 128*i* within heating zone 1110 for quick synthesis (e.g., solid-state reaction) and reactive sintering. For example, in an inert atmosphere, the heating elements 1112, 1114 can provide a temperature of at least 2000° C. (e.g., ≥3000° C.), which can be sufficient for synthesizing and sintering ceramic materials. In some embodiments, the heating elements 1112, 1114 can ramp up from room temperature to the sintering temperature in approximately thirty seconds or less, followed by approximately ten seconds of sintering time and then rapid cooling to room temperature in approximately in five seconds. After sintering, the sintered material 1128*s* can be transferred by a tilt mechanism 1120 (e.g., formed of a refractory ceramic, such as carbide) that pivots the heating element 1114 about a rotation axis 1118, as shown at stage 1100*d*. In output stage 1100*e*, the sintered material 1128*s* can then be moved by conveyor film 1102 to outlet region 1126 for subsequent processing or use.

In some embodiments, either or both of heating elements 1112, 1114 can be composed of conductive carbon materials, such as carbon papers, carbon felts, carbon clothes, graphite papers, graphite felts, graphite clothes, graphite films, or graphite plates. Alternatively or additionally, in some embodiment, other conductive materials or composites can be used for the heating elements 1112, 1114. In some embodiments, the heating elements 1112, 1114 can be sized based on sizes of the materials 1128*i* to be sintered and/or to meet manufacturing needs (e.g., to provide sufficient throughput of sintered materials 1128*s*). For example, the heating elements 1112, 1114 can have a width of about 2 cm and a length of about 10 cm (e.g., in a plane parallel to a direction of material travel). Other shapes and sizes for the heating elements are also possible according to one or more contemplated embodiments. In some embodiments, a distance between upper heating element 1112 and material 1128*i* can be adjusted by shift guides 1122, which can be constructed to support and/or move the upper heating element. For example, the shift guides 1122 can be formed of refractory ceramics, such as silicon carbide, boron carbide, etc.

When the heating elements 1112, 1114 are made of conductive materials, they can be heated by an electrical source (not shown) passing electrical current through the conductive materials of the heating elements via wiring cables 1116 (for example, formed of a refractory metal, such as tungsten, or a combination of copper and silver). The amount of current through the conductive material of the heating elements 1112, 1114 can correspond to the heating rate. The heating rate and electrical source can be controlled by a controller (not shown) by providing a desired amount of current through the conductive materials of the heating elements 1112, 1114.

Figure 12A:
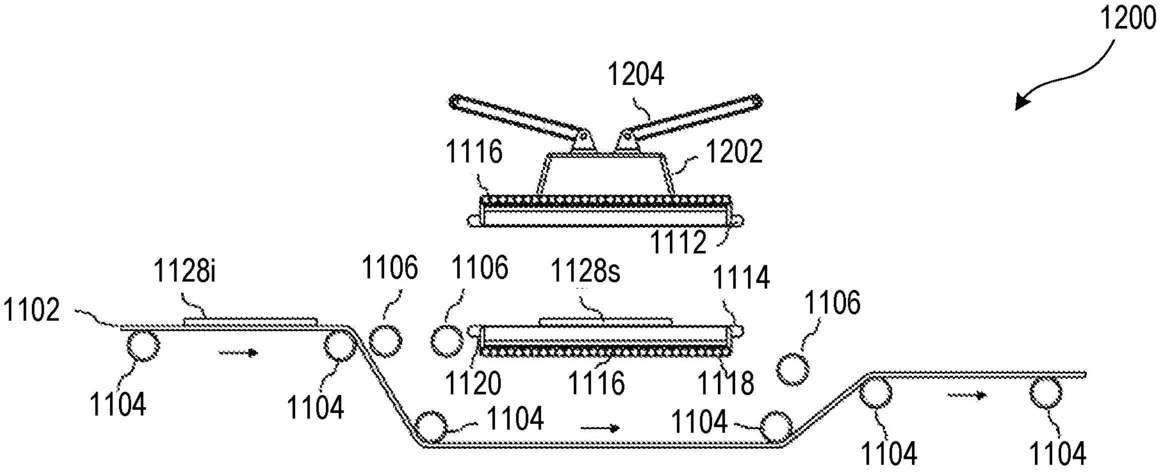
FIGS. 12A-12B are simplified cross-sectional and perspective diagrams, respectively, of a portion of an exemplary high temperature sintering furnace employing a pair of opposed heating elements, material compression, and material transfer, according to one or more embodiments of the disclosed subject matter.
Figure 12B:
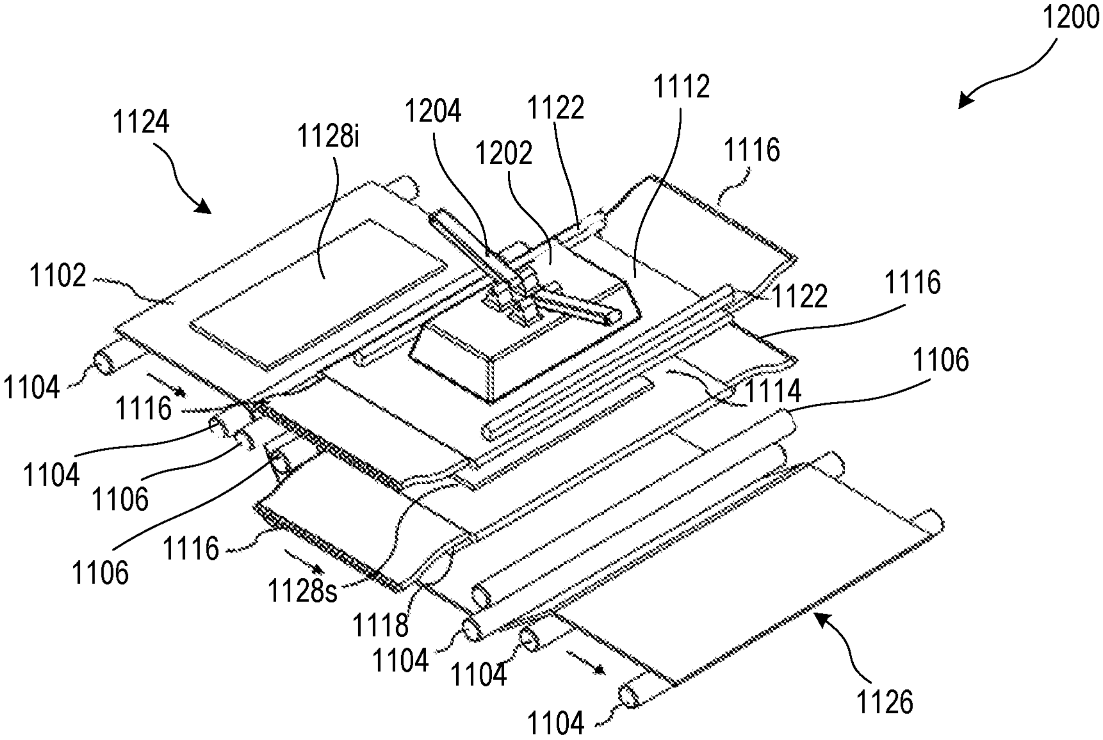

FIGS. 12A-12B show another configuration of a high temperature sintering furnace system 1200, for example, for roll-to-roll processing. The heating elements 1112, 1114, transport assembly, and operation of furnace system 120 can be similar to that described above with respect to FIGS. 12A-12B; however, the furnace system 1200 can further include mechanisms to apply pressure to the heating elements 1112, 1114, and thereby to the to-be-sintered material 1128*i*. For example, a pressure applicator 1202 (e.g., platen) can be controlled via actuation mechanism 1204 (e.g., connection rod) to apply pressure to material during sintering, which can result in sintered materials having a higher density. In some embodiments, the amount of pressure exerted can be electronically controlled by a controller (not shown) based on a desired density and/or any other parameter. For example, the pressure applicator 1202, the actuation mechanism 1204, or both can be formed of a refractory ceramic, such as silicon carbide. Alternatively, in some embodiments, the pressure may be applied to the heating elements 1112, 1114 and the material 1128*i* by other types of mechanisms, such as hydraulic plates, robotic/mechanical arms, or any other mechanical pressure application mechanism.

Figure 13A:
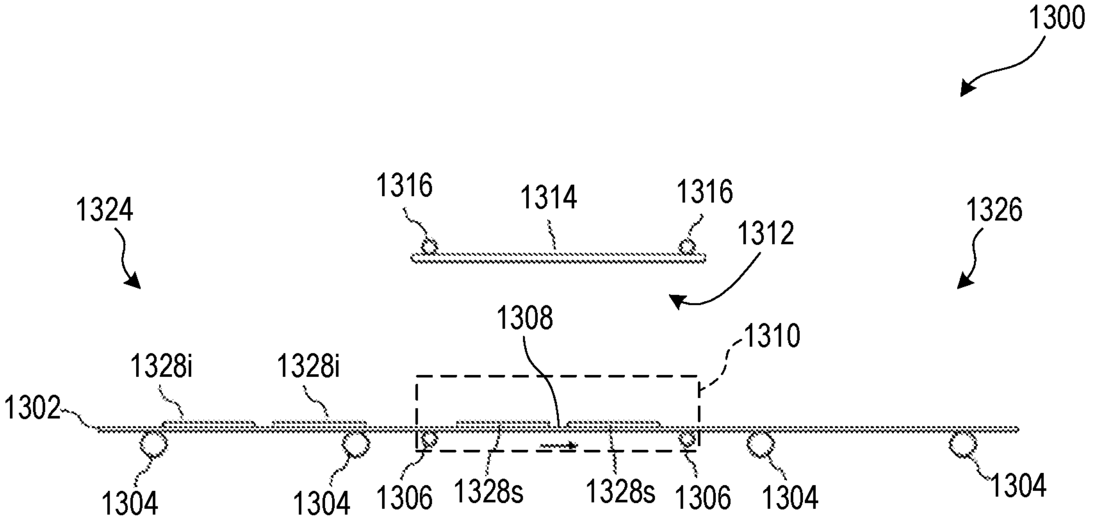
FIGS. 13A-13B are simplified cross-sectional and perspective diagrams, respectively, of a portion of an exemplary high temperature sintering furnace employing a pair of opposed heating elements without material transfer, according to one or more embodiments of the disclosed subject matter.
Figure 13B:
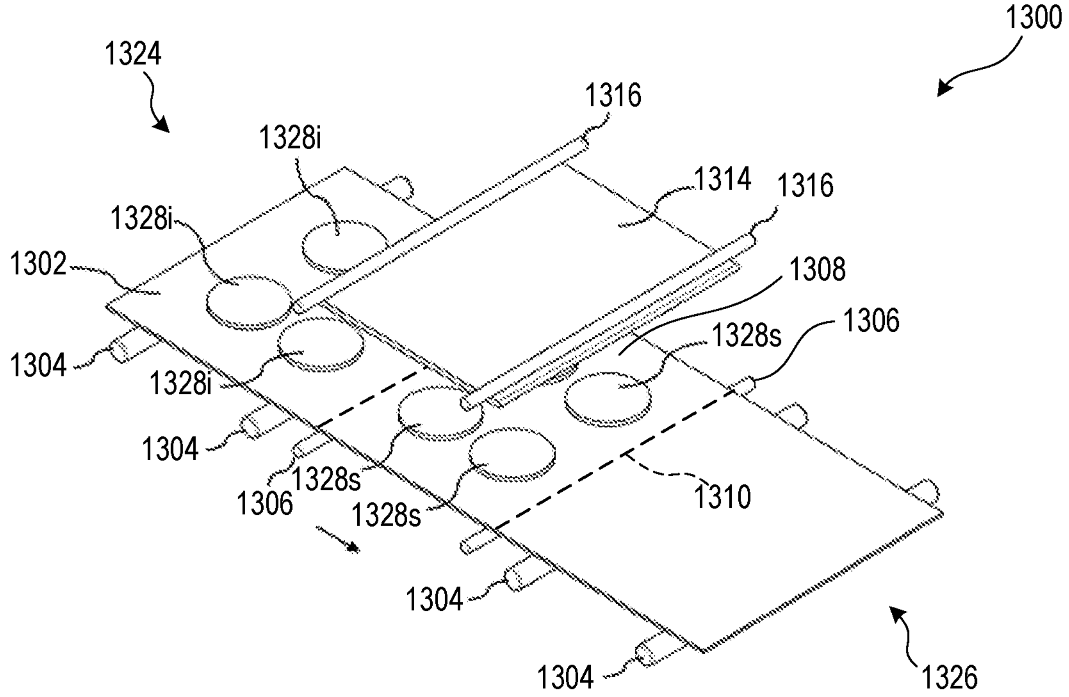

FIGS. 13A-13B show another configuration of a high temperature sintering furnace system 1300, for example, for roll-to-roll processing. In the illustrated example, upper heating element 1314 can be movable and can be placed into contact with the to-be-sintered material 1328*i* by wiring conductor guides 1316 (e.g. formed of a refractory material, such as tungsten), for example, by eliminating gap 1312 between the heating element 1314 and the conveyor film 1302. Conveyor film 1302 (e.g., formed of carbon) can carry materials (e.g., to-be-sintered materials 1328*i* and sintered materials 1328*s*) from inlet region 1324 to outlet region 1326 without otherwise requiring transfer to a separate heating element. Rather, wiring current conductors 1306 (e.g., formed of a refractory material, such as tungsten) energize the portion 1308 of the conveyor film 1302 within a heating zone 1310 to act as a lower heating element, while rollers 1304 (e.g., formed of a metal, such as stainless steel) support and move the conveyor film away from the heating zone 1310. Although not shown in the figures, a conveyor system that moves the conveyor film 1302 can include one or more motors, one or more controllers, and/or other conventional components. In some embodiments, a controller can control an electrical power supply (e.g., current source) to heat the heating elements 1308, 1314 and/or can control the conveyor system to advance material to/from the heating zone 1310 and/or control the conductor guides 1316 to move the upper heating element 1314 to/from the heating zone 1310.

Figure 14A:
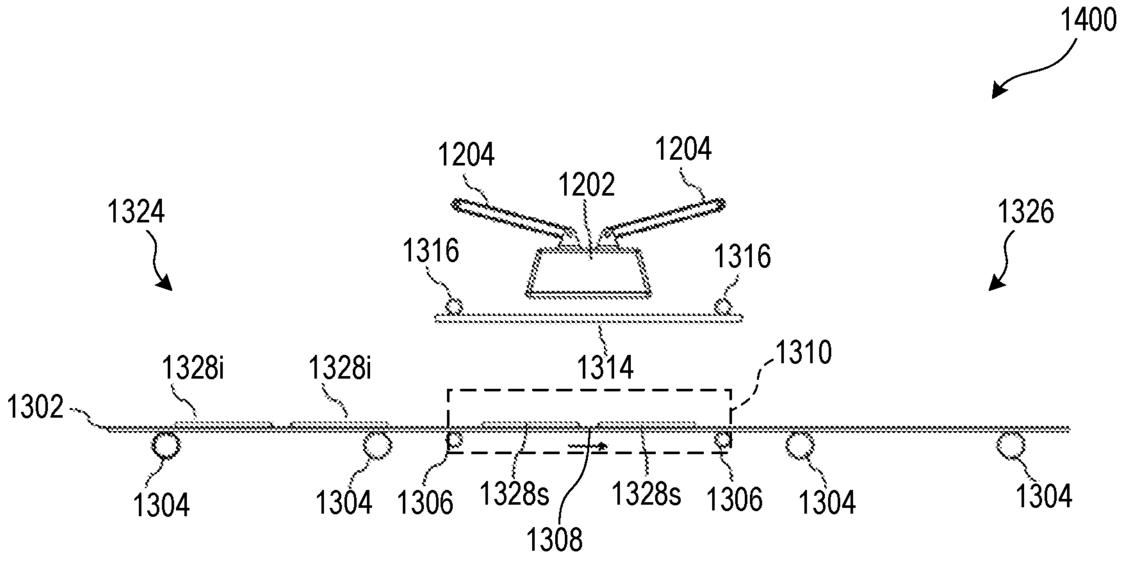
FIGS. 14A-14B are simplified cross-sectional and perspective diagrams, respectively, of a portion of an exemplary high temperature sintering furnace employing a pair of opposed heating elements with material compression and without material transfer, according to one or more embodiments of the disclosed subject matter.
Figure 14B:
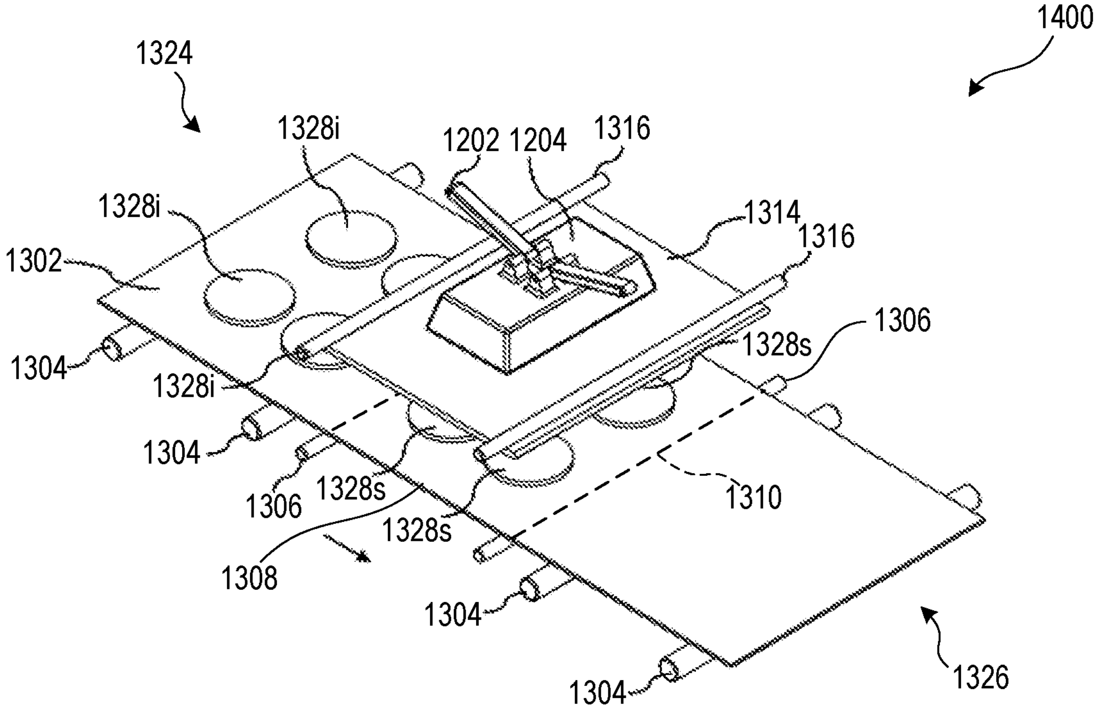

FIGS. 14A-14B show another configuration of a high temperature sintering furnace system 1400, for example, for roll-to-roll processing. The heating elements 1308, 1314, transport assembly, and operation of furnace system 1400 can be similar to that described above with respect to FIGS. 13A-13B; however, the furnace system 1300 can further include mechanisms to apply pressure to the heating elements 1308, 1314, for example, a pressure applicator 1202 (e.g., platen) controlled via actuation mechanism 1204 (e.g., connection rod) that operates in a manner similar to that described above with respect to FIGS. 12A-12B.

Figure 15A:
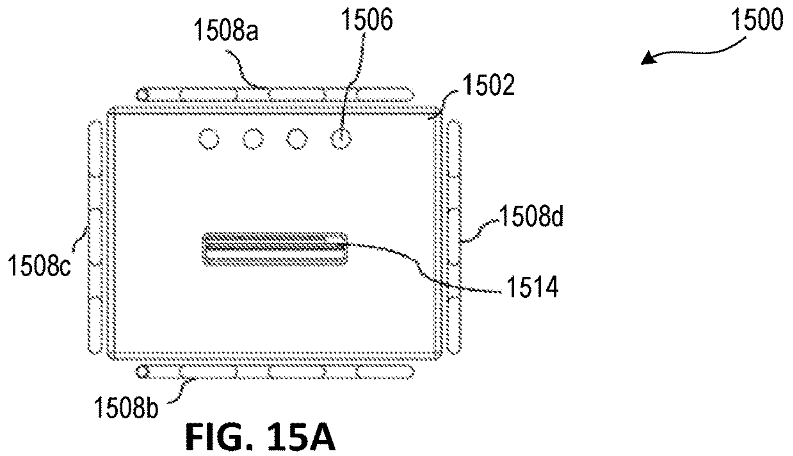
FIGS. 15A-15C are simplified outlet side, perspective, and partial perspective diagrams, respectively, of an exemplary high temperature sintering furnace employing active exterior cooling, according to one or more embodiments of the disclosed subject matter.
Figure 15B:
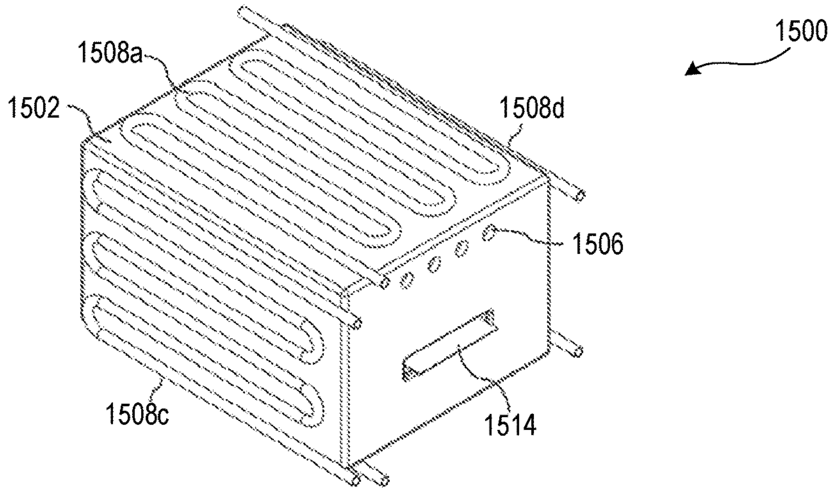
Figure 15C:
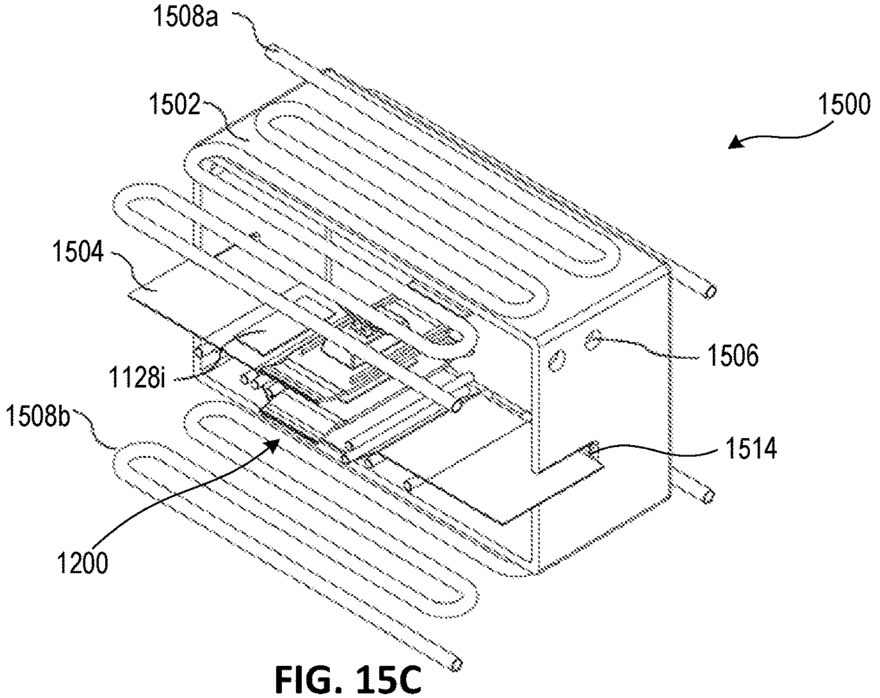

FIGS. 15A-15C show another configuration of a high-temperature sintering furnace system 1500, for example, for roll-to-roll processing. The heating elements, transport assembly, and operation of furnace system 1500 can be similar to that of system 1200 described above with respect to FIGS. 12A-12B; however, furnace system 1500 can further include a furnace housing 1502 and a cooling system. The furnace housing 1502 can comprise and/or define one or more shield gas inlet ports 1506, an inlet port 1504, and an outlet port 1514. In some embodiments, a periodic or continuous flow of inert gas (e.g., argon, nitrogen, argon/hydrogen mixture) can be provided through the gas inlet ports 1506, for example, to increase the service life of the heating elements and/or to provide an inert gas environment within the housing 1502. In some embodiments, the cooling system can comprise serpentine cooling conduits 1508*a*-1508*d* disposed on (e.g., in contact or adjacent to) top, bottom, and side surfaces of the furnace housing 1502. Alternatively, in some embodiments, the conduits 1508*a*-1508*d* can be integrated into housing 1502, for example, disposed beneath an exterior surface thereof but outside of an internal volume of the housing (e.g., embedded within walls of the housing). Depending on the heating power generated by the heating elements, the working fluid flowing through conduits 1508*a*-1508 can be water, oil, liquid nitrogen, etc. In some embodiments, to achieve an ultrafast cooling rate (e.g., at least 100-500° C./s), the size ratio (length of the heating zone to a length of the internal volume (e.g., from inlet to outlet)) between the heater and the furnace house can be in a range of 100-1000, inclusive.

Figure 16A:
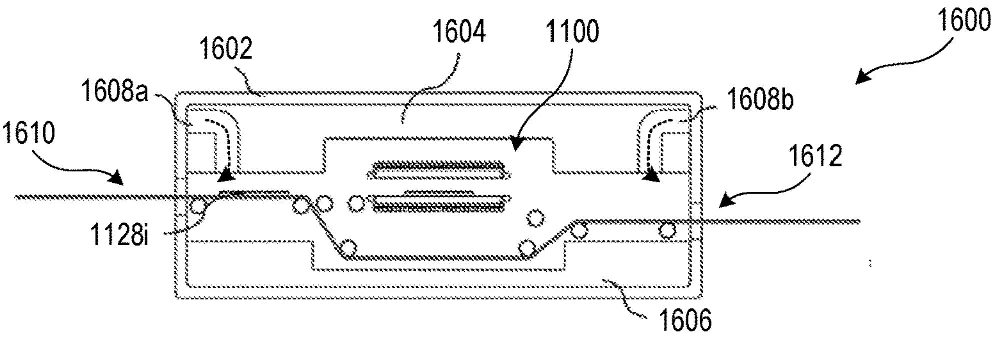
FIGS. 16A-16C are simplified cross-sectional, perspective, and partial perspective diagrams, respectively, of an exemplary high temperature sintering furnace employing interior insulation and shielding gas flow, according to one or more embodiments of the disclosed subject matter.
Figure 16B:
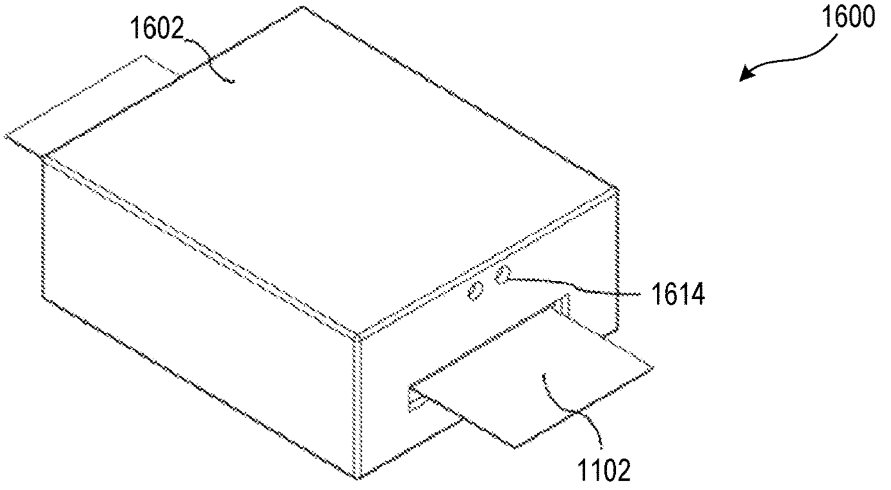
Figure 16C:
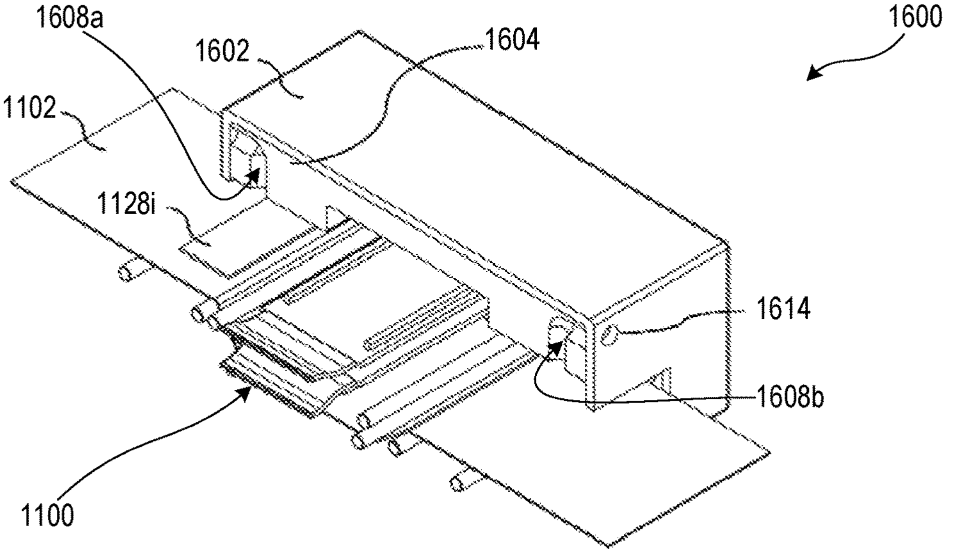

FIGS. 16A-16C show another configuration of a high-temperature sintering furnace system 1600, for example, for roll-to-roll processing. The heating elements, transport assembly, and operation of furnace system 1600 can be similar to that of system 1100 described above with respect to FIGS. 11A-11B; however, furnace system 1600 can further include a furnace housing 1602 with insulating materials 1604, 1606. The furnace housing 1602 can comprise and/or define one or more shield gas flow channels 1608*a*, 1608*b* (e.g., formed in insulating material 1604), an inlet port 1610, and an outlet port 1612. In some embodiments, a periodic or continuous flow of inert gas (e.g., argon, nitrogen, argon/hydrogen mixture) can be provided via the gas flow channels 1608*a*, 1608*b* (e.g., via gas inlet ports 1614), for example, to increase the service life of the heating elements and/or to provide an inert gas environment within the housing 1602. For example, the insulating materials 1604, 1606 can be formed of fiberglass, porous ceramic, aerogel, etc. In some embodiments, the size (e.g., thickness) of insulating materials 1604, 1606 can be determined based on a requirement for maximum temperature outside of or on an external surface of the furnace housing 1602 during the thermal shock process, as well as the corresponding thermal conductivity of the insulating materials.

Figure 17A:
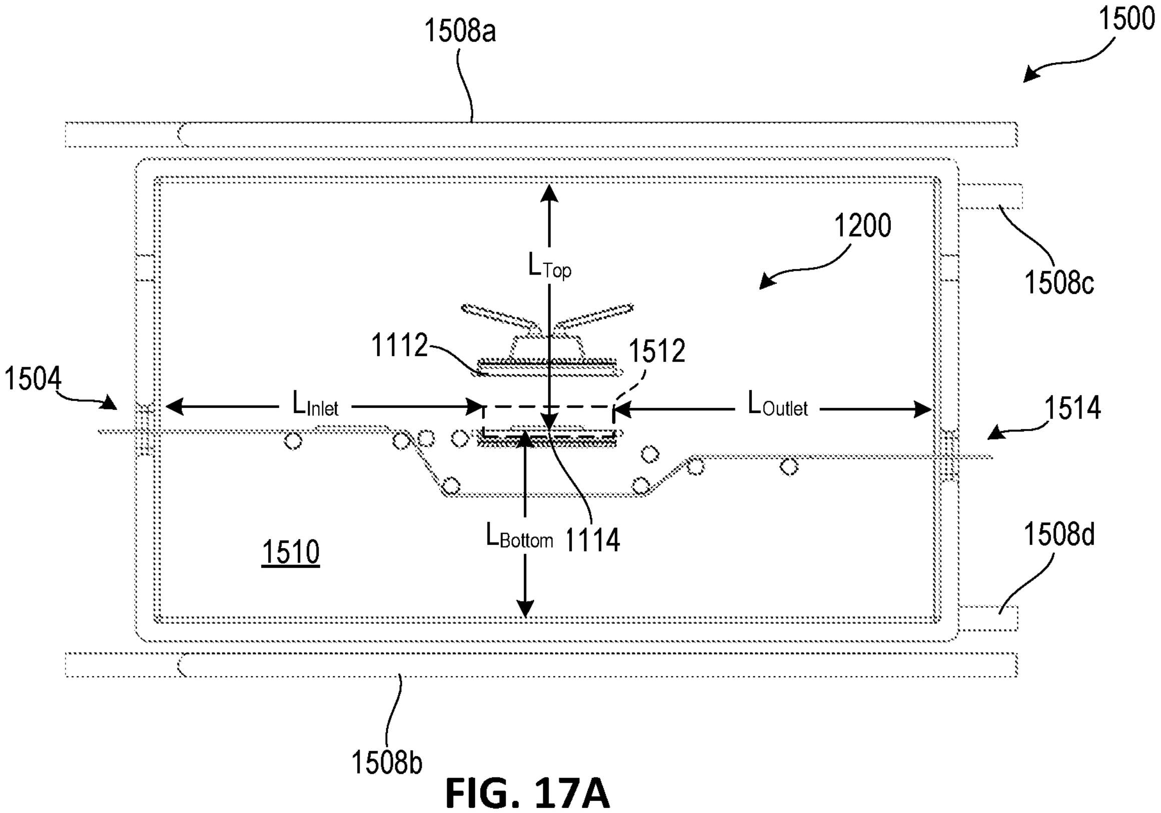
FIGS. 17A-17B are simplified cross-sectional diagrams of internal volumes of an exemplary high temperature sintering furnace employing active cooling and an exemplary high temperature sintering furnace employing insulation, respectively, according to one or more embodiments of the disclosed subject matter.
Figure 17B:
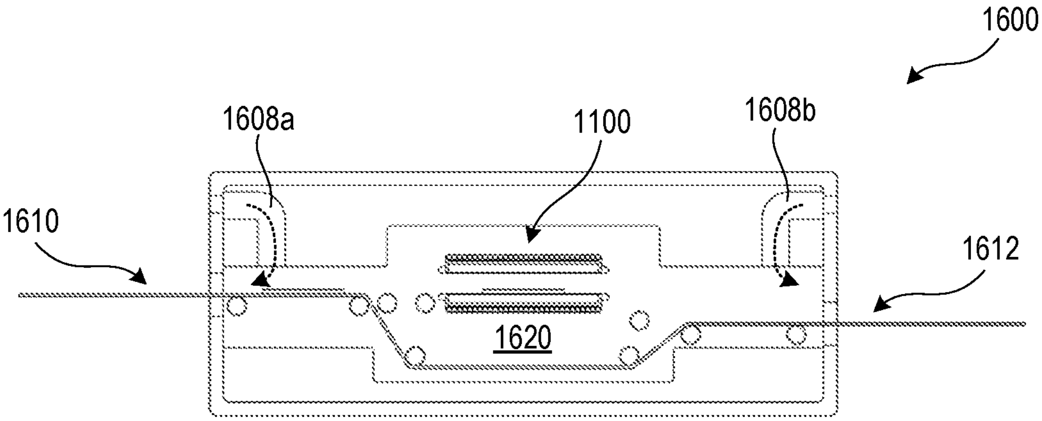

To illustrate relative sizes between furnace systems with and without insulation, FIG. 17A shows a sintering furnace system 1500 similar to that described above with respect to FIGS. 15A-15B, and FIG. 17B shows a sintering furnace system 1600 similar to that described above with respect to FIGS. 16A-16B. In some embodiments, the use of insulation can allow the furnace system 1600 to be much smaller than furnace system 1500 in terms of external footprint as well as size of internal volumes (e.g., volume 1620>>volume 1510). To allow sufficient cooling in the larger furnace system 1500 (with or without active cooling features), the size of the internal volume 1510 can be much greater than that of heating zone 1512. Positioning and/or size of the heating zone with respect to sidewalls of the internal volume 1510 can also be customized to allow for sufficient cooling at the end of the thermal shock profile and/or to minimize or reduce communication of high temperatures external to the housing.

For example, $L_{inlet}$ (e.g., a length from inlet 1504 to closest end of heating zone 1512 (e.g., edge of heating element 1114)), $L_{outlet}$ (e.g., a length from outlet 1514 to closest end of heating zone 1512 (e.g., edge of heating element 1114)), or both can be greater (e.g., at least 5× or at least 50×) than a width of the heating zone 1512. Alternatively or additionally, $L_{top}$ (e.g., a height between from top end of interior volume 1510 to closest end of heating zone 1512 (e.g., top surface of heating element 1114), $L_{bottom}$ (e.g., a height between from bottom end of interior volume 1510 to closest end of heating zone 1512 (e.g., top surface of heating element 1114)), or both can be greater (e.g., at least 5× or at least 50×) than a height of the heating zone.

Figure 18A:
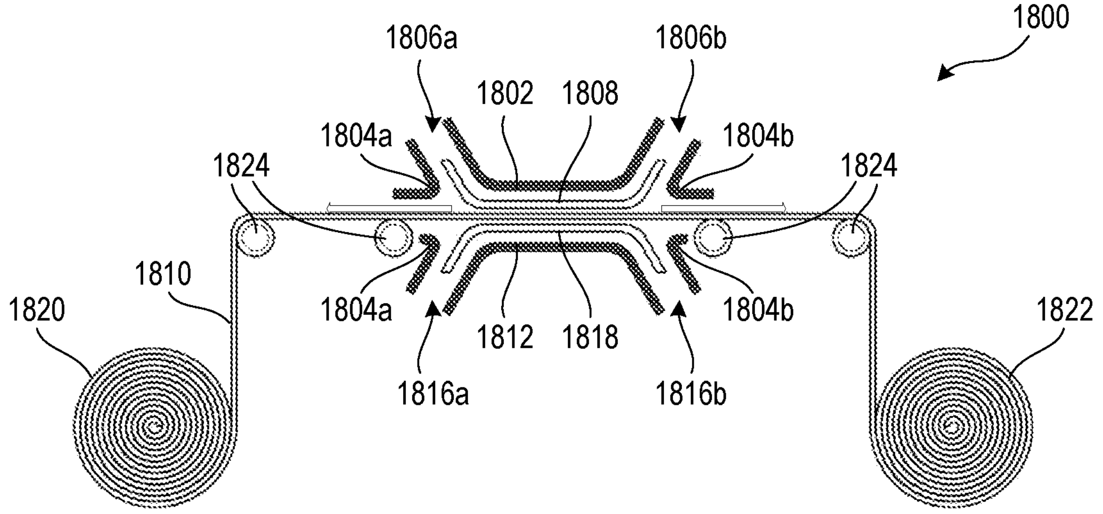
FIGS. 18A-18B are simplified cross-sectional and perspective diagrams, respectively, of a portion of a high temperature sintering furnace employing one or more shells for shielding gas flow, according to one or more embodiments of the disclosed subject matter.
Figure 18B:
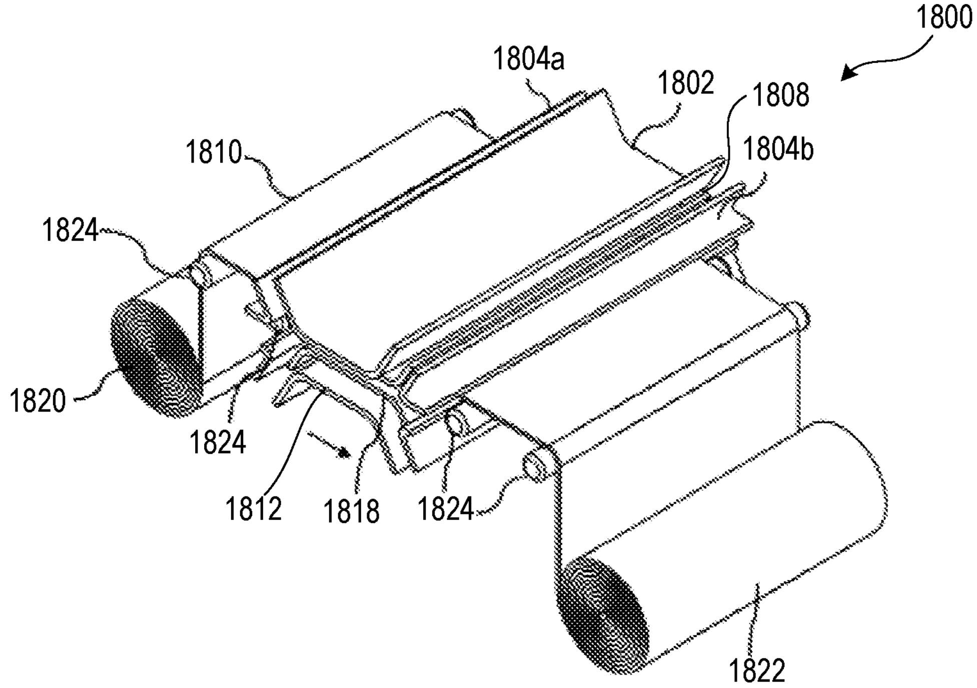

FIGS. 18A-18B show another configuration of a high temperature sintering furnace system 1800, for example, for roll-to-roll processing. The high temperature sintering furnace system 1800 employs a pair of opposed heating elements, for example, an upper heating element 1808 and a lower heating element 1818 for heating a material therebetween carried by a conveyor substrate 1810. In the illustrated roll-to-roll configuration, the conveyor substrate 1810 can be supplied from an input roller 1820, supplied to a heating zone between the heating elements 1808, 1818 via transfer rollers 1824 (e.g., formed of a refractory metal, such as tungsten), and then wound on an output roller 1822 after sintering. The sintering furnace system 1800 can also have a pair of primary shell members 1802, 1812 disposed on opposite sides of the heating zone, with the heating elements 1808, 1818 disposed therebetween. The sintering furnace system 1800 can also have a first pair of secondary shell members 1804*a* disposed on opposite sides of conveyor substrate 1810 at an inlet end of the heating zone, and a second pair of secondary shell members 1804*b* disposed on opposite sides of conveyor substrate 1810 at an outlet end of the heating zone. The first pair of secondary shell members 1804*a* can cooperate to form an inlet port through which the conveyor substrate 1810 extends, and the second pair of secondary shell members 1804*b* can cooperate to form an outlet port through which the conveyor substrate 1810 extends. In some embodiments, primary shell member 1802 can cooperate with adjacent secondary shell members 1804*a*, 1804*b* to form respective inlet conduits 1806*a*, 1806*b* for flow of an inert gas, and primary shell member 1812 can cooperate with adjacent secondary shell members 1804*a*, 1804*b* to form respective inlet conduits 1816*a*, 1816*b* for flow of an inert gas.

Figure 19A:
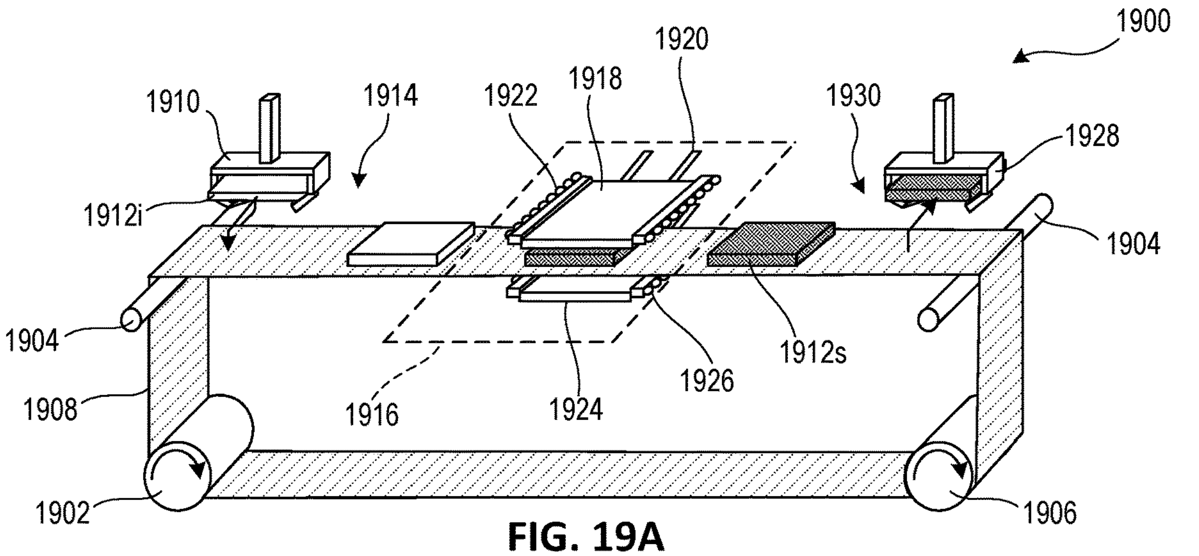
FIG. 19A is a simplified perspective diagram of a portion of an exemplary high temperature sintering furnace employing robotic loading/unloading of a material and a single pair of heating elements, according to one or more embodiments of the disclosed subject matter.
Figure 19B:
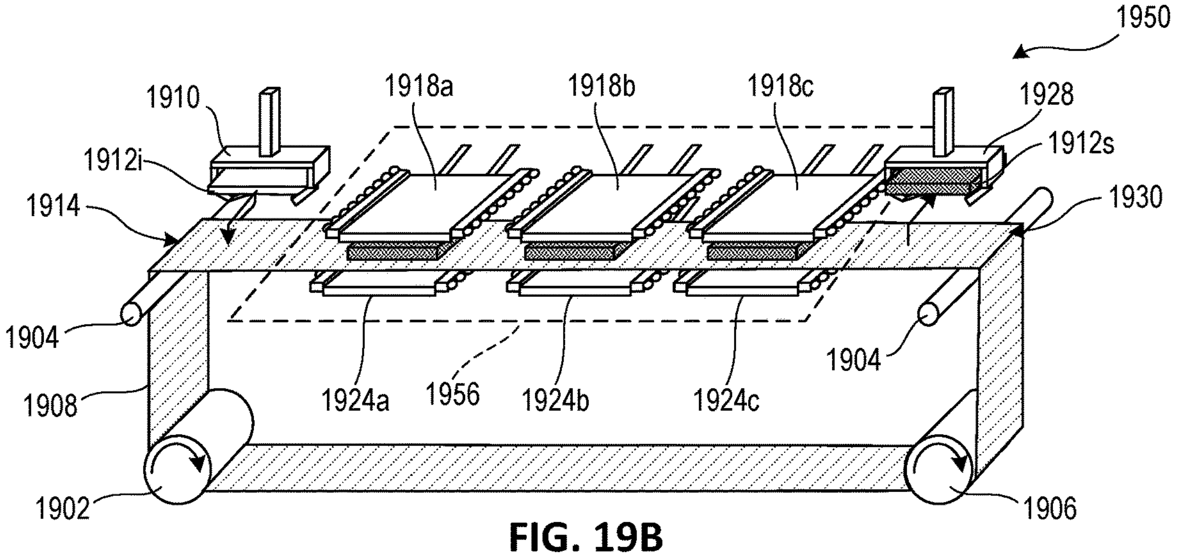
FIG. 19B is a simplified perspective diagram of a portion of another exemplary high temperature sintering furnace employing robotic loading/unloading of a material and multiple pairs of heating elements, according to one or more embodiments of the disclosed subject matter.

FIG. 19A shows another configuration of a high temperature sintering furnace system 1900, for example, employing a continuous conveyor setup. A conveyor film 1908 can carry a to-be-sintered material 1912*i* (e.g., a precursor substrate, such as a green tape) that is loaded by a sample feeding mechanism 1910 (e.g., a robotic placement unit) to an input zone 1914 upstream of a heating zone 1916. The conveyor film 1908 can be moved by one or more drive rollers 1902, 1906 and supported by one or more redirection rollers 1904, for example, to position the material 1912*i* within heating zone 1916 of heating elements 1918, 1924. The heating elements 1918, 1924 can be moved toward (e.g., having a spacing between heating elements of 5-20 cm, inclusive) and/or into contact with material 1912*i*, for example, via shift guides 1920 (e.g., formed of a refractory ceramic, such as carbide). By applying an electrical current to the heating elements 1918, 1924, for example, via wiring 1922, 1926 (e.g., formed of a refractory metal, such as tungsten), the material 1912*i* can be rapidly heated via radiation and/or conduction to form a uniform high-temperature environment that converts the to-be-sintered material 1912*i* into sintered material 1912*s*. The sintered material 1912*s* can be removed from the conveyor film 1908, for example, at an outlet zone 1930 downstream of heating zone 1916 using a sample selection mechanism 1928 (e.g., a robotic picker unit). Although a single heating zone 1916 for processing of a single material 1912*i* at a time, multiple heating element pairs 1918*a-c*, 1924*a-c* and corresponding heating zones can be provided for simultaneous batch processing 1956 of multiple materials 1912*i*, as shown, for example, by the system 1950 of FIG. 19B.

Figure 20:
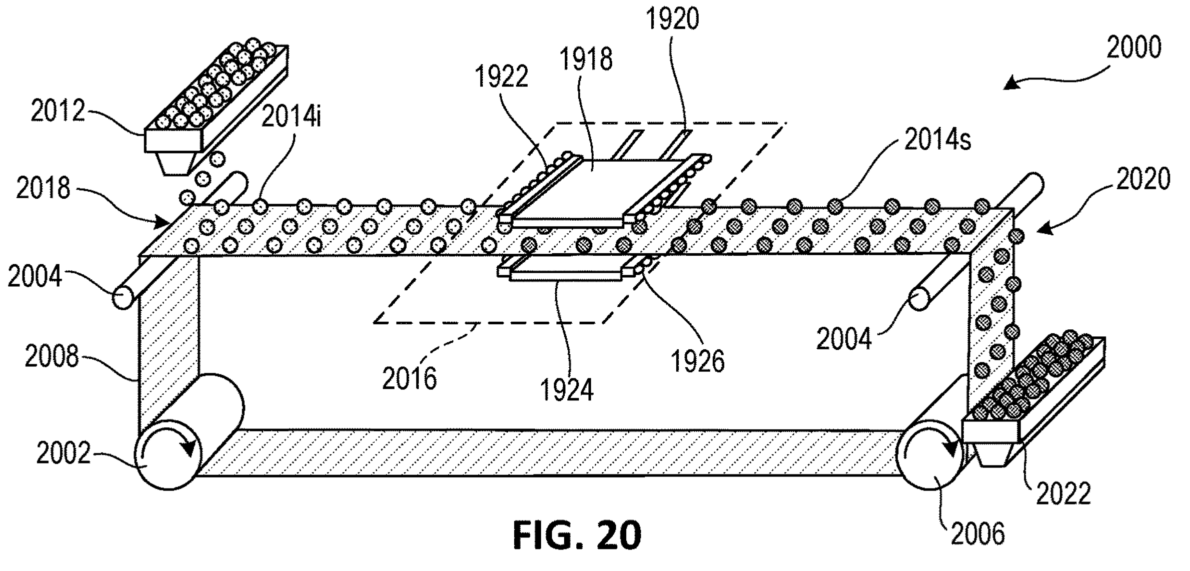
FIG. 20 is a simplified perspective diagram of a portion of an exemplary high temperature sintering furnace employing precursor particle dispensing on a conveyor, according to one or more embodiments of the disclosed subject matter.

FIG. 20 shows another configuration of a high temperature sintering furnace system 2000, for example, employing a continuous conveyor setup. A conveyor film 2008 can carry a to-be-sintered material 2014*i* (e.g., material precursor particles, such as a powder) that is deposited thereon from a particle dispenser 2012 to an input zone 2018 upstream of a heating zone 2016. The conveyor film 2008 can be moved by one or more drive rollers 2002, 2006 and supported by one or more redirection rollers 2004, for example, to position the material 2014*i* within heating zone 2016 of heating elements 1918, 1924. The heating elements 1918, 1924 can be moved toward (e.g., having a spacing between heating elements of 5-20 cm, inclusive) and/or into contact with material 2014*i*, for example, via shift guides 1920 (e.g., formed of a refractory ceramic, such as carbide). By applying an electrical current to the heating elements 1918, 1924, for example, via wiring 1922, 1926 (e.g., formed of a refractory metal, such as tungsten), the material 2014*i* can be rapidly heated via radiation and/or conduction to form a uniform high-temperature environment that converts the to-be-sintered material 2014*i* into sintered material 2014*s* (e.g., sintered particles). The sintered material 2014*s* can be removed from the conveyor film 2008, for example, at an outlet zone 2020 downstream of heating zone 2018 and collected in a particle collector 2022. Alternatively or additionally, in some embodiments, a precursor material can be integrated with (e.g., pre-deposited on or embedded within) the conveyor film 2008 (e.g., in a roll-to-roll setup), in which case particle dispenser 2012 and/or collector 2022 may be omitted.

Figure 21A:
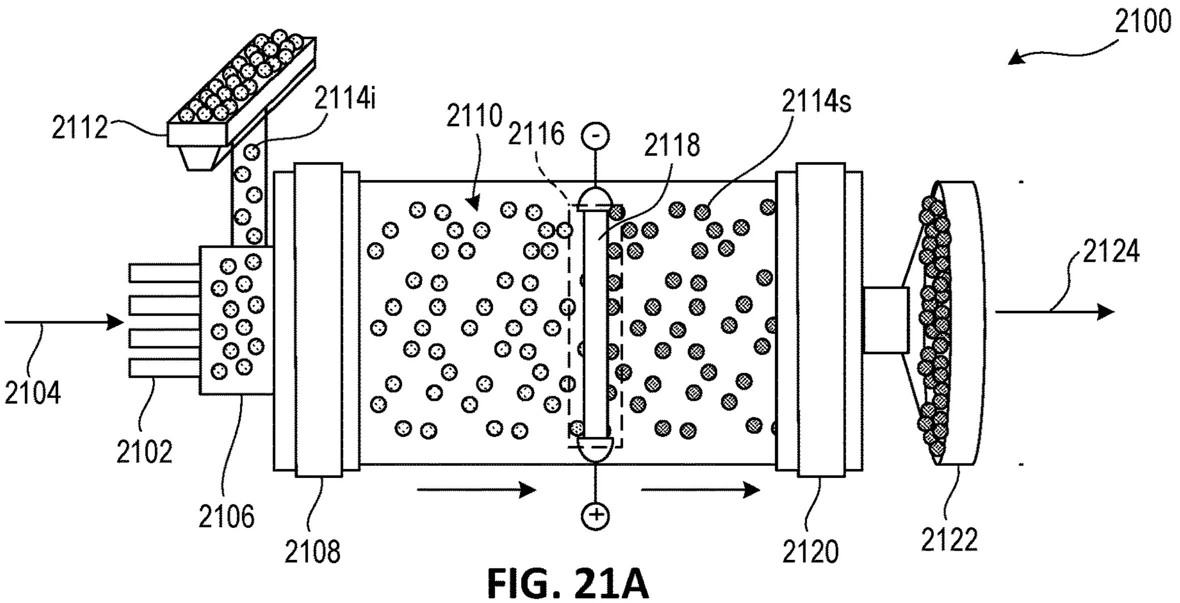
FIG. 21A is a simplified cross-sectional diagram of a portion of an exemplary gas-supported flow-through high temperature sintering furnace, according to one or more embodiments of the disclosed subject matter.
Figure 21B:
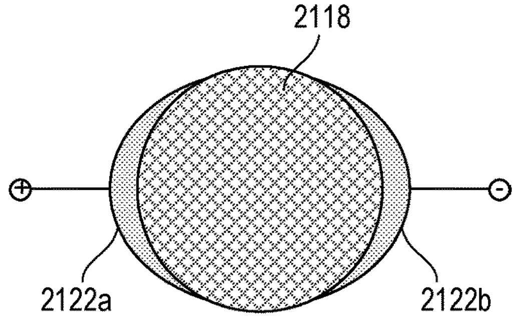
FIG. 21B is a simplified plan view of an exemplary flow-through heating element that can be used in the sintering furnace of FIG. 21A, according to one or more embodiments of the disclosed subject matter.

FIGS. 21A-21B show another configuration for a high temperature sintering furnace system 2100, for example, employing a fly-through, porous reactor setup. The system 2100 can have a porous heating element 2118, for example, electrically connected to an electrical power source via electrical contacts 2122*a*, 2122*b* (e.g., conductive paste, such as a silver paste). Although FIG. 21A illustrates a single heating element 2118, in some embodiments, more than one heating element can be provided, for example, in a serial arrangement (e.g., with spacing between sequential heaters of 1-5 cm, inclusive). One or more precursor powders 2114*i* (e.g., metal nitrites, metal chlorides, etc.) can be provided via a particle dispenser 2112 to a fluid suspension mixing manifold 2106 (e.g., powder injection zone) where it is combined with and carried by a carrier gas 2104 (e.g., an inert gas such as argon, nitrogen, etc.) provided to gas inlet 2102. The gas-powder flow is provided in turn to an inlet interface 2108 to access interior volume 2110 of the furnace (e.g., a quartz tube). The gas flow can carry the particles 2114*i* to the heating zone 2116 and through the porous heating element 2118 (e.g., having a pore size in a range of 10 μm to 10 mm, inclusive), whereby the particles can be subjected to the thermal shock profile to convert into sintered particles 2114*s*. The sintered particles 2114*s* can exit the furnace at outlet interface 2120 and can be separated from an outlet gas flow 2124 by sample collector 2122 (e.g., a filter member or mesh having a sufficiently small size to capture particles 2114*s*).

Figure 22:
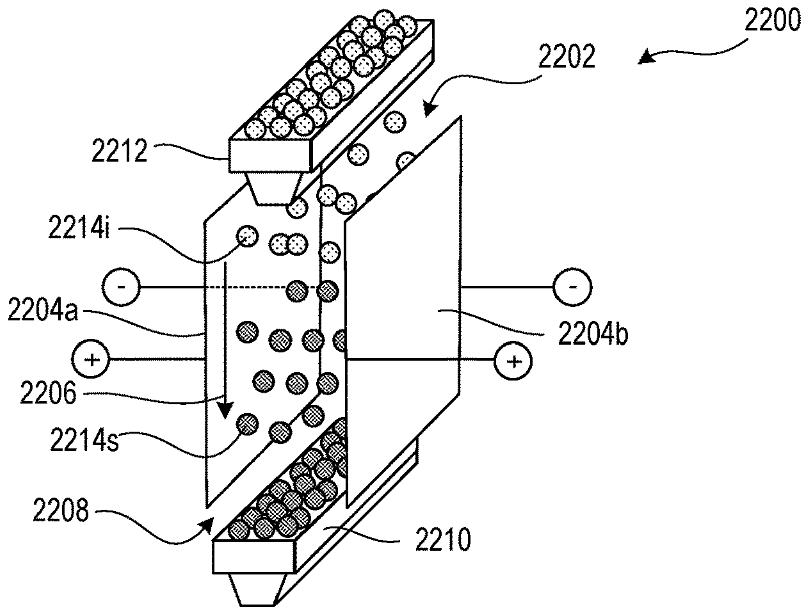
FIG. 22 is a simplified perspective diagram of a portion of an exemplary gravity-directed flow through high temperature sintering furnace, according to one or more embodiments of the disclosed subject matter.

FIG. 22 shows another configuration for a high temperature sintering furnace system 2200, for example, employing a fly-through reactor setup that relies on gravity. Similar to system 2100, one or more precursor particles 2214*i* (e.g., metal nitrites, metal chlorides, etc.) can be provided via a particle dispenser 2212, which flow under the action of gravity 2206 from an inlet end 2202 of a heating zone between a pair of heating elements 2204*a*, 2204*b* (e.g., arranged substantially parallel to a direction of gravity) to an outlet end 2208 of the heating zone. As the particles 2214*i* pass between the heating elements 2204*a*, 2204*b*, the particles can be subjected to the thermal shock profile to convert into sintered particles 2214*s*, which can in turn be collected at particle collector 2210.

Additional Examples of the Disclosed Technology

In view of the above-described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A sintering furnace comprising:

a housing defining an interior volume, an inlet to the interior volume, and an outlet from the interior volume;

at least one heating element disposed within the interior volume of the housing between the inlet and the outlet, each heating element being constructed to subject a heating zone to a temperature profile;

a conveying assembly constructed to move one or more substrates into, within, and out of the housing; and a control system operatively coupled to the at least one heating element and the conveying assembly, the control system comprising one or more processors and computer readable storage media storing instructions that, when executed by the one or more processors, cause the control system to:

(a) move, via the conveying assembly, a first substrate with one or more precursors thereon through the inlet to the heating zone;

(b) subject, via the at least one heating element, the first substrate in the heating zone to a first temperature of at least 500° C. for a first time period; and (c) move, via the conveying assembly, the first substrate with one or more sintered materials thereon from the heating zone and through the outlet.

Clause 2. The sintering furnace of any clause or example herein, in particular, Clause 1, wherein the at least one heating element comprises a Joule-heating element formed of carbon, graphite, a metal, or any combination of the foregoing.

Clause 3. The sintering furnace of any clause or example herein, in particular, any one of Clauses 1-2, wherein the at least one heating element is formed as a sheet or film.

Clause 4. The sintering furnace of any clause or example herein, in particular, any one of Clauses 1-3, further comprising, for each heating element:

a first conductive fixture coupled to a first end of the respective heating element;

a second conductive fixture coupled to a second end of the respective heating element, the second end being opposite the first end;

a first metal clip coupled to the first conductive fixture and applying a clamping force to the first conductive fixture and the first end of the respective heating element; and a second metal clip coupled to the second conductive fixture and applying a clamping force to the second conductive fixture and the second end of the respective heating element.

Clause 5. The sintering furnace of any clause or example herein, in particular, Clause 4, wherein:

the first conductive fixture, the second conductive fixture, or both comprise one or more graphite plates;

the first metal clip, the second metal clip, or both comprise a copper clip or a stainless-steel clip with a copper coating; or any combination of the above.

Clause 6. The sintering furnace of any clause or example herein, in particular, any one of Clauses 4-5, further comprising:

a current source; and electrical wiring coupling the current source to the first and second metal clips, wherein the control system is operatively coupled to the current source and the computer readable storage media stores instructions that, when executed by the one or more processors, cause the control system to control the current source to apply, via the electrical wiring, a current pulse to the at least one heating element to subject the first substrate to the first temperature.

Clause 7. The sintering furnace of any clause or example herein, in particular, Clause 6, wherein the electrical wiring comprises a refractory metal, or the electrical wiring is formed of tungsten.

Clause 8. The sintering furnace of any clause or example herein, in particular, any one of Clauses 1-7, wherein:

a ratio of a travel length within the housing between the inlet and the outlet to a length of the heating zone is at least 100:1;

a ratio of a volume of the interior volume to a volume of the heating zone is at least 100:1; or both of the above.

Clause 9. The sintering furnace of any clause or example herein, in particular, Clause 1-7, wherein:

a ratio of a travel length to the length of the heating zone is in a range of 100:1 to 1000:1, inclusive;

a ratio of a volume of the interior volume to the volume of the heating zone is in a range of 100:1 to 1000:1, inclusive; or both of the above.

Clause 10. The sintering furnace of any clause or example herein, in particular, any one of Clauses 1-9, wherein:

the first temperature is in a range of 1000-3000° C., inclusive;

a duration of the first time period is less than or equal to 60 seconds;

a duration of the first time period is approximately 10 seconds;

at a beginning of the first time period, a heating ramp rate to the first temperature is at least $10^2$° C./s;

at an end of the first time period, a cooling ramp rate from the first temperature is at least $10^3$° C./s; or any combination of the above.

Clause 11. The sintering furnace of any clause or example herein, in particular, any one of Clauses 1-10, wherein:

the first substrate comprises a polymer; and the computer readable storage media stores additional instructions that, when executed by the one or more processors, cause the control system to, prior to (b):

(d) subject, via the at least one heating element or another heating element within the housing, the first substrate to a temperature less than the first temperature so as to carbonize the polymer of the first substrate.

Clause 12. The sintering furnace of any clause or example herein, in particular, any one of Clauses 1-10, wherein:

the first substrate comprises a polymer; and the computer readable storage media stores additional instructions that, when executed by the one or more processors, cause the control system to, prior to (a):

(d) subject, via at least one external heating element, the first substrate to a temperature less than the first temperature so as to carbonize the polymer of the first substrate.

Clause 13. The sintering furnace of any clause or example herein, in particular, any one of Clauses 11-12, wherein the temperature of (d) is less than 200° C.

Clause 14. The sintering furnace of any clause or example herein, in particular, any one of Clauses 11-13, wherein a duration of a time period of (d) is greater than a duration of the first time period of (b).

Clause 15. The sintering furnace of any clause or example herein, in particular, any one of Clauses 1-14, wherein the conveying assembly comprises one or more support rollers, one or more transfer rollers, one or more rotational actuators, a conveyor belt, or any combination of the foregoing.

Clause 16. The sintering furnace of any clause or example herein, in particular, any one of Clauses 1-15, wherein the conveying assembly comprises:

one or more first transfer rollers disposed prior to the heating zone and constructed to separate the first substrate from the conveyor belt and to transfer the first substrate to the heating zone; and one or more second transfer rollers disposed after the heating zone and constructed to transfer the first substrate from the heating zone to the conveyor belt.

Clause 17. The sintering furnace of any clause or example herein, in particular, any one of Clauses 15-16, wherein the conveyor belt passes around or below the heating zone.

Clause 18. The sintering furnace of any clause or example herein, in particular, any one of Clauses 15-17, wherein:

the one or more support rollers comprises one or more metals;

the one or more support rollers is formed of stainless steel;

the one or more transfer rollers comprises one or more refractory metals;

the one or more transfer rollers is formed of tungsten;

the conveyor belt is formed of carbon; or any combination of the above.

Clause 19. The sintering furnace of any clause or example herein, in particular, any one of Clauses 15-18, wherein:

the at least one heating element comprises a first heating element disposed to support the first substrate in the heating zone, the first heating element being constructed to heat the first substrate via conduction.

Clause 20. The sintering furnace of any clause or example herein, in particular, Clause 19, further comprising a transfer actuator constructed to move the first heating element between a first position supporting the first substrate in a substantially horizontal orientation and a second position angled with respect to horizontal such that the first substrate slides from the heating zone.

Clause 21. The sintering furnace of any clause or example herein, in particular, Clause 20, wherein the transfer actuator comprises a refractory ceramic, or the transfer actuator is formed of a carbide.

Clause 22. The sintering furnace of any clause or example herein, in particular, any one of Clauses 15-21, wherein:

the at least one heating element comprises a second heating element spaced from the first substrate in the heating zone;

the second heating element is actuatable between a third position distal from the first substrate and a fourth position in contact with the first substrate; and the second heating element is constructed to heat the first substrate via conduction.

Clause 23. The sintering furnace of any clause or example herein, in particular, any one of Clauses 15-21, wherein:

the at least one heating element comprises a second heating element spaced from the first substrate in the heating zone;

the second heating element is actuatable between a third position distal from the first substrate and a fourth position proximal to the first substrate; and the second heating element is constructed to heat the first substrate via radiation.

Clause 24. The sintering furnace of any clause or example herein, in particular, Clause 23, wherein, in the fourth position, a spacing between the second heating element and the first substrate is in a range of 0-1 cm.

Clause 25. The sintering furnace of any clause or example herein, in particular, any one of Clauses 22-24, wherein the second heating element comprises one or more displacement guides.

Clauses 26. The sintering furnace of any clause or example herein, in particular, Clause 25, wherein the one or more displacement guides comprises a refractory ceramic, or the one or more displacement guides is formed of a carbide.

Clause 27. The sintering furnace of any clause or example herein, in particular, any one of Clauses 1-26, further comprising:

a platen within the housing; and a compression actuator coupled to the platen, wherein the control system is operatively coupled to the compression actuator, and the computer readable storage media stores additional instructions that, when executed by the one or more processors, cause the control system to, displace, via the compression actuator, the platen so as to press a first of the at least one heating element into the first substrate during (b).

Clause 28. The sintering furnace of any clause or example herein, in particular, Clause 27, wherein the compression actuator is disposed external to the housing and is coupled to the platen via one or more connection rods.

Clause 29. The sintering furnace of any clause or example herein, in particular, any one of Clauses 27-28, wherein:

the platen comprises a refractory ceramic;

the platen is formed of a carbide;

the one or more connection rods comprise a refractory ceramic;

the one or more connection rods is formed of a carbide; or any combination of the above.

Clause 30. The sintering furnace of any clause or example herein, in particular, any one of Clauses 1-29, wherein the conveying assembly comprises one or more support rollers, one or more rotational actuators, a conveyor belt, or any combination of the foregoing.

Clause 31. The sintering furnace of any clause or example herein, in particular, Clause 30, further comprising:

a pair of first current conductors electrically coupled to opposite ends of a first of the at least one heating element;

a pair of second current conductors electrically coupled to conveyor belt at opposite ends of the heating zone, a portion of the conveyor belt within the heating zone forming a second of the at least one heating element; or any combination of the above.

Clause 32. The sintering furnace of any clause or example herein, in particular, any one of Clauses 31, wherein:

the pair of first current conductors, the pair of second current conductors, or both comprise a refractory metal; or the pair of first current conductors, the pair of second current conductors, or both are formed of tungsten.

Clause 33. The sintering furnace of any clause or example herein, in particular, any one of Clauses 30-32, wherein the conveyor belt passes through and supports the first substrate within the heating zone.

Clause 34. The sintering furnace of any clause or example herein, in particular, any one of Clauses 30-33, wherein a first of the at least one heating element is spaced from the first substrate in the heating zone, is actuatable between a third position distal from the first substrate and a fourth position in contact with the first substrate, and is constructed to heat the first substrate via conduction.

Clause 35. The sintering furnace of any clause or example herein, in particular, any one of Clauses 30-34, wherein a first of the at least one heating element is spaced from the first substrate in the heating zone, is actuatable between a third position distal from the first substrate and a fourth position proximal to the first substrate, and is constructed to heat the first substrate via radiation.

Clause 36. The sintering furnace of any clause or example herein, in particular, Clause 35, wherein, in the fourth position, a spacing between the first of the at least one heating element and the first substrate is in a range of 0-1 cm.

Clause 37. The sintering furnace of any clause or example herein, in particular, any one of Clauses 1-36, further comprising a cooling system thermally coupled to and constructed to cool the housing.

Clause 38. The sintering furnace of any clause or example herein, in particular, Clause 37, wherein the cooling system comprises a heat exchanger with at least one working fluid flowing therethrough.

Clause 39. The sintering furnace of any clause or example herein, in particular, Clause 38, wherein the at least one working fluid comprises water, air, oil, liquid nitrogen, or any combination of the foregoing.

Clause 40. The sintering furnace of any clause or example herein, in particular, any one of Clauses 38-39, wherein the heat exchanger comprises a serpentine conduit disposed adjacent to or in contact with an exterior shell of the housing.

Clause 41. The sintering furnace of any clause or example herein, in particular, any one of Clauses 1-40, wherein:
- the housing has one or more gas ports coupled to a supply of inert gas; and
- the housing is constructed such that inert gas supplied to the one or more gas ports flows through the interior volume and exits via the inlet and the outlet.

Clause 42. The sintering furnace of any clause or example herein, in particular, any one of Clauses 1-41, wherein a size of the interior volume of the housing is at least 100 times greater than a size of the heating zone.

Clause 43. The sintering furnace of any clause or example herein, in particular, any one of Clauses 41, further comprising:
- a first insulating layer disposed within the interior volume between the at least one heating element and a shell of the housing; and
- a second insulating layer disposed within the interior volume between the conveying assembly and the shell of the housing.

Clause 44. The sintering furnace of any clause or example herein, in particular, Clause 43, wherein the first insulating layer, the second insulating layer, or both form one or more conduits that extend from the one or more gas ports and direct the inert gas toward a portion of the conveying assembly proximal to the inlet, a portion of the conveying assembly proximal to the outlet, a first end of the at least one heating element, a second end of the at least one heating element, or any combination of the foregoing.

Clause 45. The sintering furnace of any clause or example herein, in particular, any one of Clause 43-44, wherein:
- the shell of the housing comprises a metal;
- the shell of the housing is formed of aluminum or stainless steel;
- the first insulating layer, the second insulating layer, or both are formed of fiberglass or a porous ceramic aerogel; or
- any combination of the above.

Clause 46. The sintering furnace of any clause or example herein, in particular, any one of Clauses 41-45, further comprising:
- one or more shield gas partitions bounding a region in which the at least one heating element is disposed, the one or more shield gas partitions defining at least one conduit that directs the inert gas from the one or more gas ports toward one or more ends of the at least one heating element.

Clause 47. The sintering furnace of any clause or example herein, in particular, any one of Clauses 1-46, further comprising one or more shield gas nozzles disposed within the interior volume and constructed to direct gas flow toward one or more ends of the at least one heating element.

Clause 48. The sintering furnace of any clause or example herein, in particular, any one of Clauses 1-47, further comprising:
- a first robotic positioner constructed to load a substrate onto to the conveying assembly at a location proximal to and upstream from the inlet of the housing;
- a second robotic positioner constructed to unload a substrate from the conveying assembly at a location proximal to and downstream from the outlet of the housing; or
- both of the above.

Clause 49. The sintering furnace of any clause or example herein, in particular, any one of Clauses 1-48, further comprising:
- a dispenser constructed to deposit one or more precursors onto a substrate supported by or part of the conveying assembly at a location proximal to and upstream from the inlet of the housing;
- a sample collector constructed to receive one or more sintered materials from a substrate supported by or part of the conveying assembly at a location proximal to and downstream from the outlet of the housing; or
- both of the above.

Clause 50. The sintering furnace of any clause or example herein, in particular, any one of Clauses 1-49, wherein the one or more substrates comprises part of the conveying assembly.

Clause 51. The sintering furnace of any clause or example herein, in particular, any one of Clauses 1-50, wherein the one or more substrates comprises a portion of a conveyor belt of the conveying assembly.

Clause 52. The sintering furnace of any clause or example herein, in particular, Clause 51, wherein the conveyor belt is formed of a conductive carbon material.

Clause 53. The sintering furnace of any clause or example herein, in particular, any one of Clauses 1-52, wherein a first of the at least one heating element has an area in plan view of at least 20 $cm^2$.

Clause 54. The sintering furnace of any clause or example herein, in particular, any one of Clauses 1-53, wherein the computer readable storage media stores instructions that, when executed by the one or more processors, cause the control system to control the at least one heating element such that:
- a temperature in the heating zone increases from about room temperature to the first temperature during a second time period immediately preceding the first time period; and
- a temperature in the heating zone decreases from the first temperature to about room temperature during a third time period immediately following the first time period.

Clause 55. The sintering furnace of any clause or example herein, in particular, Clause 54, wherein:
- a duration of the second time period is greater than a duration of the first time period;
- a duration of the second time period is 30 seconds or less;
- a duration of the first time period is greater than a duration of the third time period;
- a duration of the first time period is about 10 seconds;
- a duration of the third time period is 5 seconds or less;
- a rate of heating to the first temperature during the second time period is less than a rate of cooling from the first temperature during the third time period;
- a rate of heating to the first temperature during the second time period is at least 100° C./s;
- a rate of cooling from the first temperature during the third time period is at least 100° C./s; or
- any combination of the above.

Clause 56. A sintering furnace comprising:
- a housing defining an interior volume, an inlet to the interior volume, and an outlet from the interior volume;
- a dispenser constructed to provide one or more precursor particles to the inlet of the housing;

at least one heating element disposed within the interior volume of the housing between the inlet and the outlet, each heating element being constructed to subject one or more precursor particles to a temperature profile; and a control system operatively coupled to the at least one heating element, the control system comprising one or more processors and computer readable storage media storing instructions that, when executed by the one or more processors, cause the control system to subject, via the at least one heating element, the one or more precursor particles to a first temperature of at least 500° C. for a first time period.

Clause 57. The sintering furnace of any clause or example herein, in particular, Clause 56, wherein each heating element is porous such that the one or more precursor particles pass therethrough when subjected to the first temperature.

Clause 58. The sintering furnace of any clause or example herein, in particular, any one of Clauses 56-57, further comprising:

a gas manifold connected to the dispenser, a supply of inert gas, and the inlet of the housing, wherein the gas manifold is constructed to combine the one or more precursor particles with a flow of inert gas such that the one or more precursor particles are carried by the inert gas flow through the at least one heating element.

Clause 59. The sintering furnace of any clause or example herein, in particular, any one of Clauses 56-58, further comprising a sample collector constructed to receive one or more sintered particles from the outlet of the housing.

Clause 60. The sintering furnace of any clause or example herein, in particular, Clause 59, wherein:

the sample collector is connected to the outlet of the housing; and the sample collector comprises a porous filter membrane that allows the inert gas flow to pass therethrough while capturing sintered particles thereon.

Clause 61. The sintering furnace of any clause or example herein, in particular, any one of Clauses 56-60, wherein the at least one heating element is electrically coupled to a current source via conductive paste.

Clause 62. The sintering furnace of any clause or example herein, in particular, any one of Clauses 56-61, wherein:

the at least one heating element comprises a pair of substantially parallel heating elements separated by a gap so as to define a vertically-extending heating volume;

the dispenser is disposed vertically above the inlet of the housing, such that the one or more precursor particles are delivered to the inlet and pass through the vertically-extending heating volume by gravity; and the sample collector is disposed vertically below the outlet of the housing, such that the one or more sintered particles from the heating volume pass through the outlet to the sample collector by gravity.

Clause 63. The sintering furnace of any clause or example herein, in particular, any one of Clauses 56-62, wherein the at least one heating element comprises a Joule-heating element formed of carbon, graphite, a metal, or any combination of the foregoing.

Clause 64. The sintering furnace of any one of claims 56-63, further comprising:

a current source; and electrical wiring coupling the current source to the at least one heating element, wherein the control system is operatively coupled to the current source and the computer readable storage media stores instructions that, when executed by the one or more processors, cause the control system to control the current source to apply, via the electrical wiring, a current pulse to the at least one heating element to subject the one or more precursor particles to the first temperature.

Clause 65. The sintering furnace of any clause or example herein, in particular, Clause 64, wherein the electrical wiring comprises a refractory metal, or the electrical wiring is formed of tungsten.

Clause 66. The sintering furnace of any clause or example herein, in particular, any one of Clauses 56-65, wherein:

the first temperature is in a range of 1000-3000° C., inclusive;

a duration of the first time period is less than or equal to 60 seconds;

a duration of the first time period is approximately 10 seconds; or any combination of the above.

Clause 67. The sintering furnace of any clause or example herein, in particular, any one of Clauses 56-66, further comprising a cooling system thermally coupled to and constructed to cool the housing.

Clause 68. The sintering furnace of any clause or example herein, in particular, Clause 67, wherein the cooling system comprises a heat exchanger with at least one working fluid flowing therethrough.

Clause 69. The sintering furnace of any clause or example herein, in particular, Clause 68, wherein the at least one working fluid comprises water, air, oil, liquid nitrogen, or any combination of the foregoing.

Clause 70. The sintering furnace of any clause or example herein, in particular, any one of Clauses 68-69, wherein the heat exchanger comprises a serpentine conduit disposed adjacent to or in contact with an exterior shell of the housing.

Clause 71. The sintering furnace of any clause or example herein, in particular, any one of Clauses 56-70, wherein the computer readable storage media stores instructions that, when executed by the one or more processors, cause the control system to control the at least one heating element such that:

a temperature in a heating zone increases from about room temperature to the first temperature during a second time period immediately preceding the first time period; and a temperature in the heating zone decreases from the first temperature to about room temperature during a third time period immediately following the first time period.

Clause 72. The sintering furnace of any clause or example herein, in particular, Clause 71, wherein:

a duration of the second time period is greater than a duration of the first time period;

a duration of the second time period is 30 seconds or less;

a duration of the first time period is greater than a duration of the third time period;

a duration of the first time period is about 10 seconds;

a duration of the third time period is 5 seconds or less;

a rate of heating to the first temperature during the second time period is less than a rate of cooling from the first temperature during the third time period;

a rate of heating to the first temperature during the second time period is at least 100° C./s;

a rate of cooling from the first temperature during the third time period is at least 100° C./s; or any combination of the above.

CONCLUSION

Any of the features illustrated or described herein, for example, with respect to FIGS. 1A-22 and Clauses 1-72, can be combined with any other feature illustrated or described herein, for example, with respect to FIGS. 1A-22 and Clauses 1-72 to provide systems, devices, methods, and embodiments not otherwise illustrated or specifically described herein. For example, the clips of FIGS. 4B-4C can be applied to any of the heating elements in the systems of FIGS. 1A-1C and 5A-22. In another example, the shield gas configuration of FIGS. 8A-8C and/or of FIGS. 16A-16C and/or of FIGS. 18A-18B can be applied any of the furnaces of FIGS. 1A-1C and 5A-22. Other combinations and variations are also possible according to one or more contemplated embodiments. Indeed, all features described herein are independent of one another and, except where structurally impossible, can be used in combination with any other feature described herein.

In view of the many possible embodiments to which the principles of the disclosed technology may be applied, it should be recognized that the illustrated embodiments are only examples and should not be taken as limiting the scope of the disclosed technology. Rather, the scope is defined by the following claims. We therefore claim all that comes within the scope and spirit of these claims.

The invention claimed is:

1. A sintering furnace comprising:

a housing defining an interior volume, an inlet to the interior volume, and an outlet from the interior volume;

at least one heating element disposed within the interior volume of the housing between the inlet and the outlet, each heating element being constructed to subject a heating zone to a temperature profile;

a conveying assembly constructed to move one or more substrates into, within, and out of the housing; and a control system operatively coupled to the at least one heating element and the conveying assembly, the control system comprising one or more processors and computer readable storage media storing instructions that, when executed by the one or more processors, cause the control system to:

(a) move, via the conveying assembly, a first substrate with one or more precursors thereon through the inlet to the heating zone;

(b) subject, via the at least one heating element, the first substrate in the heating zone to a first temperature of at least 500° C. for a first time period; and (c) move, via the conveying assembly, the first substrate with one or more sintered materials thereon from the heating zone and through the outlet, wherein the sintering furnace further comprises, for each heating element:

a first conductive fixture coupled to a first end of the respective heating element;

a second conductive fixture coupled to a second end of the respective heating element, the second end being opposite the first end;

a first metal clip coupled to the first conductive fixture and applying a clamping force to the first conductive fixture and the first end of the respective heating element; and a second metal clip coupled to the second conductive fixture and applying a clamping force to the second conductive fixture and the second end of the respective heating element.

2. The sintering furnace of claim 1, wherein:

the first conductive fixture, the second conductive fixture, or both comprise one or more graphite plates;

the first metal clip, the second metal clip, or both comprise a copper clip or a stainless-steel clip with a copper coating; or any combination of the above.

3. The sintering furnace of claim 1, further comprising:

a current source; and electrical wiring coupling the current source to the first and second metal clips, wherein the control system is operatively coupled to the current source and the computer readable storage media stores instructions that, when executed by the one or more processors, cause the control system to control the current source to apply, via the electrical wiring, a current pulse to the at least one heating element to subject the first substrate to the first temperature.

4. The sintering furnace of claim 3, wherein the electrical wiring comprises a refractory metal, or the electrical wiring is formed of tungsten.

5. The sintering furnace of claim 1, wherein:

the first substrate comprises a polymer; and the computer readable storage media stores additional instructions that, when executed by the one or more processors, cause the control system to, prior to (b):

(d) subject, via the at least one heating element or another heating element within the housing, the first substrate to a temperature less than the first temperature so as to carbonize the polymer of the first substrate.

6. The sintering furnace of claim 1, wherein:

the first substrate comprises a polymer; and the computer readable storage media stores additional instructions that, when executed by the one or more processors, cause the control system to, prior to (a):

(d) subject, via at least one external heating element, the first substrate to a temperature less than the first temperature so as to carbonize the polymer of the first substrate.

7. The sintering furnace of claim 1, wherein:

the conveying assembly comprises one or more support rollers, one or more transfer rollers, one or more rotational actuators, a conveyor belt, or any combination of the foregoing, the at least one heating element comprises a first heating element disposed to support the first substrate in the heating zone, the first heating element being constructed to heat the first substrate via conduction, and the sintering furnace further comprises a transfer actuator constructed to move the first heating element between a first position supporting the first substrate in a substantially horizontal orientation and a second position angled with respect to horizontal such that the first substrate slides from the heating zone.

8. The sintering furnace of claim 7, wherein:

the transfer actuator comprises a refractory ceramic; or the transfer actuator is formed of a carbide.

9. The sintering furnace of claim 7, wherein:

the at least one heating element comprises a second heating element spaced from the first substrate in the heating zone;

the second heating element is actuatable between a third position distal from the first substrate and a fourth position in contact with the first substrate; and the second heating element is constructed to heat the first substrate via conduction.

10. The sintering furnace of claim 7, wherein:

the at least one heating element comprises a second heating element spaced from the first substrate in the heating zone;

the second heating element is actuatable between a third position distal from the first substrate and a fourth position proximal to the first substrate; and the second heating element is constructed to heat the first substrate via radiation.

11. The sintering furnace of claim 1, further comprising:

a platen within the housing; and a compression actuator coupled to the platen, wherein the control system is operatively coupled to the compression actuator, and the computer readable storage media stores additional instructions that, when executed by the one or more processors, cause the control system to, displace, via the compression actuator, the platen so as to press a first of the at least one heating element into the first substrate during (b).

12. The sintering furnace of claim 11, wherein the compression actuator is disposed external to the housing and is coupled to the platen via one or more connection rods.

13. The sintering furnace of claim 1, further comprising:

a cooling system thermally coupled to and constructed to cool the housing, wherein the cooling system comprises a heat exchanger with at least one working fluid flowing therethrough, and the heat exchanger comprises a serpentine conduit disposed adjacent to or in contact with an exterior shell of the housing.

14. The sintering furnace of claim 1, wherein:

the housing has one or more gas ports coupled to a supply of inert gas;

the housing is constructed such that inert gas supplied to the one or more gas ports flows through the interior volume and exits via the inlet and the outlet; and the sintering furnace further comprises:

a first insulating layer disposed within the interior volume between the at least one heating element and a shell of the housing; and a second insulating layer disposed within the interior volume between the conveying assembly and the shell of the housing.

15. The sintering furnace of claim 1, wherein:

the housing has one or more gas ports coupled to a supply of inert gas;

the housing is constructed such that inert gas supplied to the one or more gas ports flows through the interior volume and exits via the inlet and the outlet; and the sintering furnace further comprises:

one or more shield gas partitions bounding a region in which the at least one heating element is disposed, the one or more shield gas partitions defining at least one conduit that directs the inert gas from the one or more gas ports toward one or more ends of the at least one heating element.

16. The sintering furnace of claim 1, further comprising:

one or more shield gas nozzles disposed within the interior volume and constructed to direct gas flow toward one or more ends of the at least one heating element.

* * * * *